(12) United States Patent
Pinchen et al.

(10) Patent No.: US 7,891,565 B2
(45) Date of Patent: Feb. 22, 2011

(54) METHOD AND APPARATUS FOR MAKING ARTICLES

(75) Inventors: Stephen Paul Pinchen, Etwall (GB);
Jens Jacob Juul Rasmussen, Hellerup (DK)

(73) Assignee: Fracture Code Corporation, Kastrup (DK)

( * ) Notice: Subject to any disclaimer, the term of this patent is extended or adjusted under 35 U.S.C. 154(b) by 5 days.

(21) Appl. No.: 12/372,992

(22) Filed: Feb. 18, 2009

(65) Prior Publication Data

US 2009/0174914 A1 Jul. 9, 2009

Related U.S. Application Data

(63) Continuation of application No. 11/671,292, filed on Feb. 5, 2007, now Pat. No. 7,540,421, which is a continuation of application No. 10/313,185, filed on Dec. 6, 2002, now Pat. No. 7,188,774.

(30) Foreign Application Priority Data

Dec. 7, 2001 (GB) .................................. 129369.5

(51) Int. Cl.
*G06F 19/00* (2006.01)
(52) U.S. Cl. ..................................... 235/385
(58) Field of Classification Search ................. 235/385, 235/435, 439, 462.11, 487, 494, 495
See application file for complete search history.

(56) References Cited

U.S. PATENT DOCUMENTS 4,218,674 A 8/1980 Brosow et al.
4,307,899 A 12/1981 Hope
4,712,909 A 12/1987 Oshikoshi
5,354,097 A 10/1994 Tel
5,489,091 A 2/1996 Greer et al.
5,576,528 A 11/1996 Chew et al.
5,590,598 A 1/1997 Keller
5,621,219 A 4/1997 van Renesse et al.
5,719,939 A 2/1998 Tel
5,760,382 A 6/1998 Li et al.
5,813,333 A 9/1998 Ohno
5,978,761 A 11/1999 Johansson
5,978,781 A 11/1999 Sansone
6,112,982 A 9/2000 Ahlquist et al.
6,382,092 B1 5/2002 Van Den Brink et al.

(Continued)

FOREIGN PATENT DOCUMENTS

EP 0572989 A2 12/1993

(Continued)

*Primary Examiner*—Seung H Lee
(74) *Attorney, Agent, or Firm*—Banner & Witcoff, Ltd

(57) ABSTRACT

Method and apparatus for applying unique composite indicia or markings to a succession of articles, in which each unique composite indicium comprises two or more indicia. At least part of each of the indicia may be co-located at a predetermined location on the article with such co-location being unique or distinct for each composite indicium for each article. The indicium may be overprinted with one or more images, logos or color-schemes. A code (e.g. an alphanumeric string) that is stored in a database may be derived from the composite indicium from one or more mathematical properties. The code may be later accessed for identifying or verifying the article with the indicium.

24 Claims, 24 Drawing Sheets

U.S. PATENT DOCUMENTS

| | | |
|---|---|---|
| 6,598,531 B2 | 7/2003 | Nedblake, Jr. et al. |
| 6,655,579 B1 | 12/2003 | Delman et al. |
| 2001/0010332 A1 | 8/2001 | Bismarck |

FOREIGN PATENT DOCUMENTS

| | | |
|---|---|---|
| EP | 0682328 A1 | 11/1995 |
| EP | 0734871 A2 | 10/1996 |
| GB | 2282566 A | 4/1995 |
| GB | 2383878 A | 7/2003 |
| GB | 2383878 B | 7/2004 |
| JP | 7230533 | 8/1995 |
| WO | WO 96/18972 | 6/1996 |
| WO | WO 00/70537 | 11/2000 |
| WO | WO 03/038738 A1 | 5/2003 |

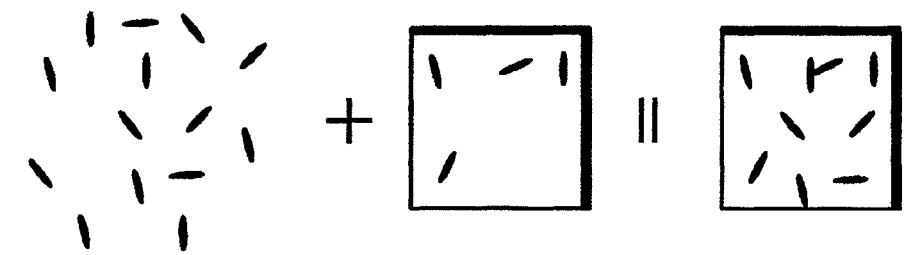
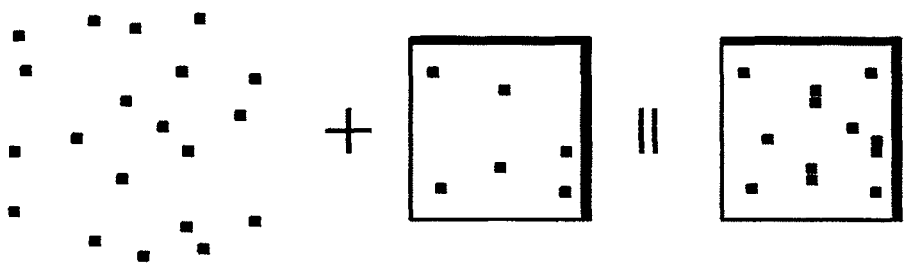
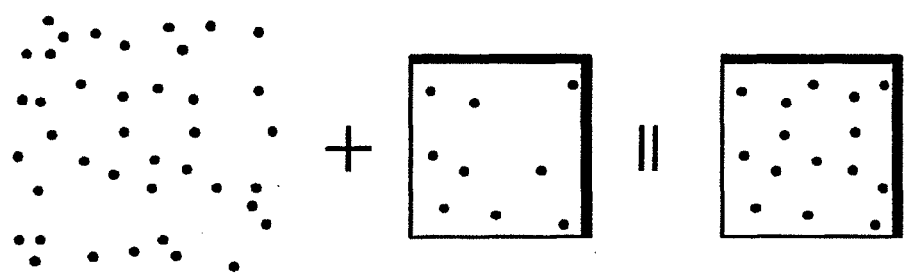
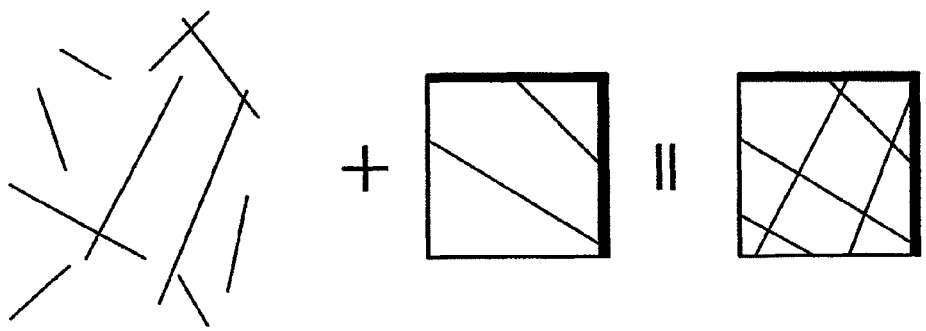
A + B = C
FIG. 7

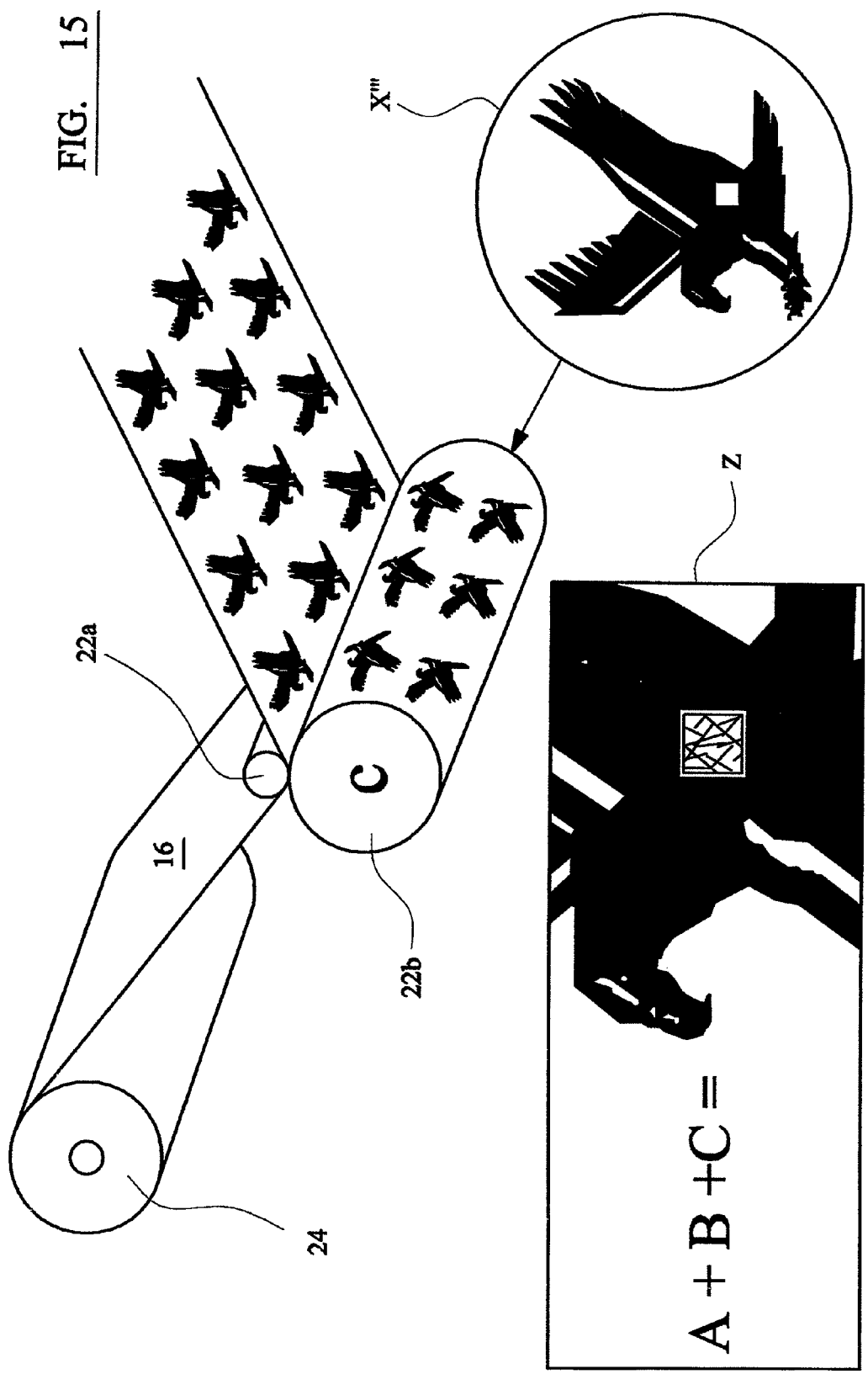

| Fracture Code ID | HR Number | Time Stamp | Brand / Type | Factory | Date |
|---|---|---|---|---|---|
| 352A1E24_353A1E45_9AD5911 | L24R11185598 | 10:04:41 PM | Gordons London Dry Gin 70 cl | Leven | 23/10/02 |
| D5207FB06_DD627F5226_F22DA4134C | L24R11185606 | 10:04:43 PM | Gordons London Dry Gin 70 cl | Leven | 23/10/02 |
| 288_2A8_2BA | L24R11185607 | 10:04:45 PM | Gordons London Dry Gin 70 cl | Leven | 23/10/02 |
| ED266_ED287_26BD6 | L24R11185604 | 10:04:46 PM | Gordons London Dry Gin 70 cl | Leven | 23/10/02 |
| 3C8C0E6BA0A26_3E8C926BA0A27_115191B52122D | L24R11185605 | 10:04:48 PM | Gordons London Dry Gin 70 cl | Leven | 23/10/02 |
| CD77199A43_D5B9299A63_2374D421A4 | L24R11185600 | 10:04:51 PM | Gordons London Dry Gin 70 cl | Leven | 23/10/02 |
| 3CA_3EB_3E3 | L24R11185603 | 10:04:55 PM | Gordons London Dry Gin 70 cl | Leven | 23/10/02 |

FIG. 16

METHOD AND APPARATUS FOR MAKING ARTICLES

CROSS REFERENCE TO RELATED APPLICATIONS

This application is a Continuation of application Ser. No. 11/671,292 filed Feb. 5, 2007 which is a Continuation of Utility patent application Ser. No. 10/313,185, filed Dec. 6, 2002, which claims priority to provisional United Kingdom Patent Application No. 0129369.5 for "Method and Apparatus for Marking Articles", filed Dec. 7, 2001.

BACKGROUND OF THE INVENTION

The present invention relates to codes such as graphic marks, or indicia, for identifying, verifying the authenticity of, tracking, or managing information relating to manufactured goods and/or their packaging, cartons, boxes, shipping cases, documents, banknotes, labels, tapes, overwrap film, stamps, tax stamps, fiscal marks, tickets, courier envelopes, vouchers, films and indeed any single article, product, or item.

DESCRIPTION OF RELATED ARTS

A known system for verifying the legitimacy of an article such as a passport or a credit card is disclosed in U.S. Pat. No. 5,719,939. In this prior art system a unique pattern is incorporated into the article. This pattern is made of fibers, which are laid down in a two- or three-dimensional base material, thus creating a unique pattern that cannot be reproduced. This pattern is then divided into appropriately sized pieces and applied to the surface of the article, or incorporated within it in such a way that the pattern can be seen from both sides of the article. A portion of the pattern is then optically scanned from at least one direction and information is derived from the scanned pattern which is converted into digital data, compressed and encrypted if required, and stored, together with any relevant information relating to the article. To identify or verify the authenticity of the article the pattern is scanned again and the information is converted and compared with the prerecorded data.

However, there are various problems associated with this system. Firstly, applying the pattern during the manufacture of mass-produced articles would be slow and time consuming, since the pattern would first have to be cut to the required size and then securely-applied to the article in the desired position. This would require additional machinery and could not be done at the speeds that are currently necessary in most large-scale manufacturing processes. Secondly, it is possible that the subsequent scanning of the pattern would result in slightly different measurements than those which have been recorded. This could be due to parallax errors if the measurement was taken at a slightly different angle from that which the initial measurement was taken, and this would be more problematic the deeper the pattern. Different measurements would also be obtained if a light source of different wavelength were used, since the pattern would diffract the light differently. The pattern could also degrade and change during the use of the article, thus changing the pattern. Thirdly, the size of the pattern is limited by the manufacturing process, and the fibers used. Thus, it may be difficult to create patterns of very small size, which may be important in the case of some goods.

A similar system to that discussed above is disclosed in U.S. Pat. No. 5,621,219. A pattern is formed from embedding fibers in a transparent material, and this is then fixed to an object that needs to be identified. Embodiments of this invention identify the pattern by projecting the silhouette of the image of the pattern using at least one light source. Using more than one light source increases the amount of information that can be obtained from the pattern when it is viewed; diffraction and parallax effects are utilized in this invention to increase the information that can be obtained. However, this requires identical sets of sophisticated equipment to be used whenever it is required that the pattern be identified; using equipment that is designed to measure the pattern differently would give different results. Furthermore, a large amount of data is recorded from each pattern, thus a large amount of data storage space per pattern is needed. The problems in manufacture outlined above also apply in relation to this system.

There are many other two-dimensional coding symbologies, examples including "datamatrix" and "PDF 417". These are used for identification of products, and a variety of automated reading techniques are employed accordingly.

However, there remains a need for a coding method which may be performed at high speed, which guarantees the application of unique marks or indicia, and which produces marks which have a high tolerance to damage or corruption, i.e. such as can be restored reliably by the reader even when a substantial portion of the mark is missing or is corrupted.

BRIEF SUMMARY OF THE INVENTION

The invention is defined in the attached independent claims. Further, preferred features of the invention may be found in the sub-claims thereto.

According to an aspect of the invention, a method and apparatus are provided for creation and application of a unique marking or indicium to each one of a series of distinct articles, each unique indicium comprising a combination of at least two separate indicia. The two are maintained out of register from article to article to which they are applied. In other words, the first indicium and the second indicium do not overlie one another in an identical pattern or manner for any two articles. Rather, they are offset with respect to each other from article to article, thereby creating a unique composite indicium for distinct articles. Each unique composite indicium associated with each distinct item or article may then be cataloged or recorded in some manner (e.g. by conversion to an alphanumeric form) along with data, information, or the like describing the article, thereby providing a highly secure but accessible record for each article and an inventory for the totality of articles. Because each composite indicium is totally unique and, by itself, need not include any self contained or recorded information, the level of security of the marking is essentially absolute.

In an embodiment of the invention, each unique composite indicium comprises a first indicium which is fixed onto a substrate or onto a distinct article and a second indicium which overlies the first indicium to define a composite pattern that is different for each distinct article. The first and second indicia may be comprised of geometric shapes depicted in two dimensions such as lines, dots, polygons, circles, ellipses, etc., or combinations thereof. In one embodiment, a first indicium is an open pattern or collection of shapes in two dimensions and the second indicium is a closed boundary encompassing a collection of shapes in two dimensions. In order to create each distinct, separate and unique composite indicium, the second indicium is made to overlie the first indicium in a distinct and separate location referred herein, inter alia, as a predetermined location. The predetermined location for each composite indicium is thus a distinct and separate location of the second indicium upon the first indicium. In this way, no two composite indicia are made to be identical.

The embodiments of the invention are especially useful when practiced using two-dimensional indicia. The indicium may comprise not only shapes, lines, and collections of shapes and lines in two dimensions but also variable spectral or color elements in two dimensions. A benefit associated with two-dimensional versions of the invention includes the highly cost-effective or inexpensive creation of such markings.

In another embodiment, a first indicium may be a pattern of forms or shapes and a second indicium may be a pattern of forms or shapes made to overlie the first pattern and a third indicium may be a coordinate marker which overlies a portion or section of the composite pattern to thereby define a common starting base or predetermined location for reading or identifying the composite indicium.

In another embodiment, more than two patterned indicia may overlie one another to provide a composite pattern in combination with a marking to specify a unique predetermined location.

The method of creating each unique composite indicium may comprise printing a first indicium on an article or substrate followed by overprinting a second indicium wherein the first and second indicia are uniquely co-located at a predetermined location to thereby create or define a series of separate and unique, composite indicia.

The method may alternatively include printing or imparting a first, two-dimensional indicium on an article having a two dimensional, patterned substrate (for example, the grain boundary pattern of an alloy or the fiber pattern of a fabric or paper material). Thus, the second indicium may comprise a characteristic or pattern of the underlying substrate rather than a fixed non-variable indicium. The separate indicium may also be variable. In any event, the composite indicium further includes the identification of a predetermined location such as a boundary marker.

As another example, the first indicium may be derived from an open, but fixed repeating pattern, and the second indicium may be a set or series of closed patterns, A closed pattern is defined as a fixed pattern having a boundary or fixed reference guide (for example, a pattern with a line defining an edge of the pattern, preferably a circumference of the pattern or at least two intersecting lines of a boundary of the pattern). The reference guide may be provided by a further printing step, which involves, for example, printing a base line on the composite indicium or by covering part of the composite of the first and second indicia.

The variance (repeatability) of the first and second indicia may be periodic. Where there are two indicia, the variance (repeatability) of each of which is periodic, the periods of repeatability of the two indicia in combination to form composite indicia may be unequal, i.e. where one is not an integral multiple of the other. Where one of the indicia has a periodic variance (pattern), and one of the indicia is fixed, and its application to successive articles is periodic, the period of variance of the variable indicium and the period of application of the fixed indicium may be unequal, and the former may not be an integral multiple of the latter. The variance (pattern) of each composite indicium may thus be controlled using mathematical principles to be infinite.

At least one of the indicium may be applied to the articles using printing means. The printing means may print one or more lines, dots, ellipses and/or polygons as one or more elements of each indicium.

The method may include at least one further printing step, wherein said further printing step includes overprinting the article with one or more images, logos or color-schemes, and leaving said predetermined location unprinted. Printing of the fixed indicium may be included in the further printing step. The composite indicium may have a border as means for establishing the orientation of the composite indicium. Alternatively, the orientation may be established by a reference guide, which may be provided by a further printing step, in which a line is printed on the indicium or in which part of the indicium is over-printed.

The invention also provides apparatus for applying unique identification marks to a succession of articles, the apparatus comprising:

first printing means arranged to print a variable indicium on an article at a predetermined location, and second printing means arranged to print another or second indicium on the article at the same location to form a composite indicium at the predetermined location, wherein the first printing means comprises a print pattern, and wherein the print pattern includes one or more features, the position, direction or orientation of which varies across the print surface, such that when printed, the position, direction or orientation of elements of the indicium in relation to the predetermined location on the article varies for successive articles, and thus a composite indicium is printed which is different for each article.

Typically, the elements in each indicium comprise lines, dots, rectangles or other polygons and/or ellipses. The first printing means may comprise a first print roller or cylinder. The second printing means may be arranged to print a second indicium which comprises a fixed pattern which may be of lines, dots, ellipses and/or polygons, and which may include a frame, border or perimeter line which may serve to mark the limit of the printed composite indicium. The limit of the composite indicium may also be defined in a further printing step such as an over-printing step. The second printing means may comprise a second print roller or cylinder, which may be arranged in use to print successive identical second indicia on successive articles.

The first and second print rollers/cylinders may be arranged to print out of phase. The first and second printing rollers/cylinders may be of different diameters or circumferences and/or may revolve at different speeds. The speed of revolution of one or both of the rollers/cylinders may be arranged to vary. All of these described techniques are designed to create unique composite indicia in an inexpensive, easily applied manner for each article.

The method may further comprise the steps of storing information derived from the composite indicium by scanning the composite indicium, calculating one or more mathematical properties related to one or more elements of the composite indicium, assigning a code (e.g. an alphanumeric character string) to the properties that uniquely identifies the composite indicium and thus the associated article, and recording this code in a database, together with any other required or desired information regarding the article to which the composite indicium is applied.

The scanning of the composite indicium and derivation of the properties relating to one or more elements of the composite indicium may also be accomplished using known fingerprint recognition techniques, for example.

The method may include means for recording and subsequently recalling information associated with each unique composite indicium by calculating a mathematical property of the indicium, using an algorithm to establish a unique code and correlating the code with a database. At least one mathematical property of the indicium that is calculated may be a function of the spatial relationship of at least some of the elements of the composite indicium to each other and/or to a border around or other boundary condition of the composite indicium.

The composite indicium may be printed onto packaging or onto the article itself. The indicium may be incorporated into a barcode which identifies a product. The indicium may be printed directly onto the packaging or the article during its manufacture, or it may be printed onto a part of the packaging (for example a tear tape or a label) in which the article is subsequently packaged. The indicium may be applied to any surface such as glass, film, paper, plastic, metal, wood, or any surface which may be printed. The composite indicia can be printed using any technique, such as, for example, gravure, flexo, letterpress, laser, inkjet, dot pen, thermo transfer or offset dependent upon the equipment available and/or the nature of the surface which is being printed.

According to another aspect of the present invention, a composite indicium is provided for representing or encoding information about an article to which the composite indicium is applied, wherein the composite indicium comprises two indicia, and is one of a series of such composite indicium, wherein at least one of the indicia in each composite indicium varies for successive composite indicia in the series.

The invention also includes a series of composite indicia, for representing or encoding information about articles to which the indicia are applied, wherein the composite indicia each comprise two indicia, one of which varies for successive composite indicia in the series.

One of the indicia may vary for successive composite indicia in the series and the other may remain fixed. Alternatively, both of the indicia may vary for successive composite indicia in the series.

Each unique composite indicium may represent or encode the information by comprising machine-readable elements, the spatial relationship of at least some of which to each other and/or to a border around the indicium is convertible into a unique character string, such as a numerical value, attributable to the composite indicium. The character string may be stored in a computer database, with any required information for an article to which the composite indicium is applied.

Once the information is stored in the database, it may be retrieved by machine-reading the composite indicium to determine the unique identification information numerical value associated with the indicium and obtaining the information corresponding to said identification information or character string from the database.

The invention therefore relates to distinct, unique indicia; the use of such indicia; the method for creating such indicia; apparatus for creating such indicia; and methods for conducting activities and business incorporating or using such indicia.

In review, each marking is comprised or created, in a two-dimensional example, by combining (co-locating and overlying) at least a first pattern and a second pattern, wherein each combination is out of register (juxtaposed) with respect to every other combination. The invention may also be expressed by such combinations of starting indicium having three dimensions and/or which are time dependent. Again the combinations are unique because they are out of register with respect to one another. With respect to composites derived from fixed patterns in two dimensions, the first pattern may be unbounded as may be the second pattern. The combination may then further incorporate a window or boundary to impose the condition that the composites derived are not in register. Alternatively, each composite may be separately derived by juxtaposing the overlying starting indicium when expressing each separate composite. A preferred methodology is to adopt the former method of expression (use of boundary condition or window) and to create unique indicia by combining the former methodology with the latter, i.e. combining at least two starting indicia and expressing a pattern thereof with a boundary condition and doing so for a series of juxtaposed starting indicia.

Thus, it is an object of the invention to provide a technique to create unique markings for individual or discrete articles.

Another object of the invention is to provide a highly cost effective method for creating such unique markings.

A further object of the invention is to provide means for creating such unique markings utilizing methods and combinations of methods that are easily undertaken and performed, and economical.

Another object of the invention is to provide a technique for creation of discrete and unique markings for individual items wherein the markings alone need not incorporate information, but may be nonetheless analyzed or cataloged utilizing various analytical tools including algorithmic conversion techniques to express the marking in machine readable terms.

Another object of the invention is to create a protocol for creation and use of unique markings for individual articles wherein each marking associated with each article (either successively or in some other order) may be cataloged or inventoried along with further data or information associated with the article.

A further object of the invention is to create a series of markings that are each unique and which are the result of combining at least a first indicium with a second indicium to form a composite indicium and wherein the combination is in each instance a unique result.

Another object of the invention is to devise a series of unique composite indicia utilizing at least two indicium that are provided as patterns in two dimensions.

These and other objects, advantages and features of the invention will be set forth in the description that follows.

BRIEF DESCRIPTION OF THE DRAWINGS

Embodiments of the invention will now be described, by way of example only, with reference to the accompanying drawings, in which:

FIG. 7 shows alternative embodiments of indicia in schematic stages A to C according to FIG. 1;

FIGS. 12 to 15 show schematically a multi-stage printing apparatus in which at stages A, B and C different indicia are combined to form a plurality of unique composite indicia on a sheet of labels, in accordance with a second embodiment of the invention;

FIG. 16 shows an exemplary database entry relating a code derived from a composite indicium and information about an associated article, in accordance with an embodiment of the invention;

DETAILED DESCRIPTION OF THE INVENTION

Figure 1:
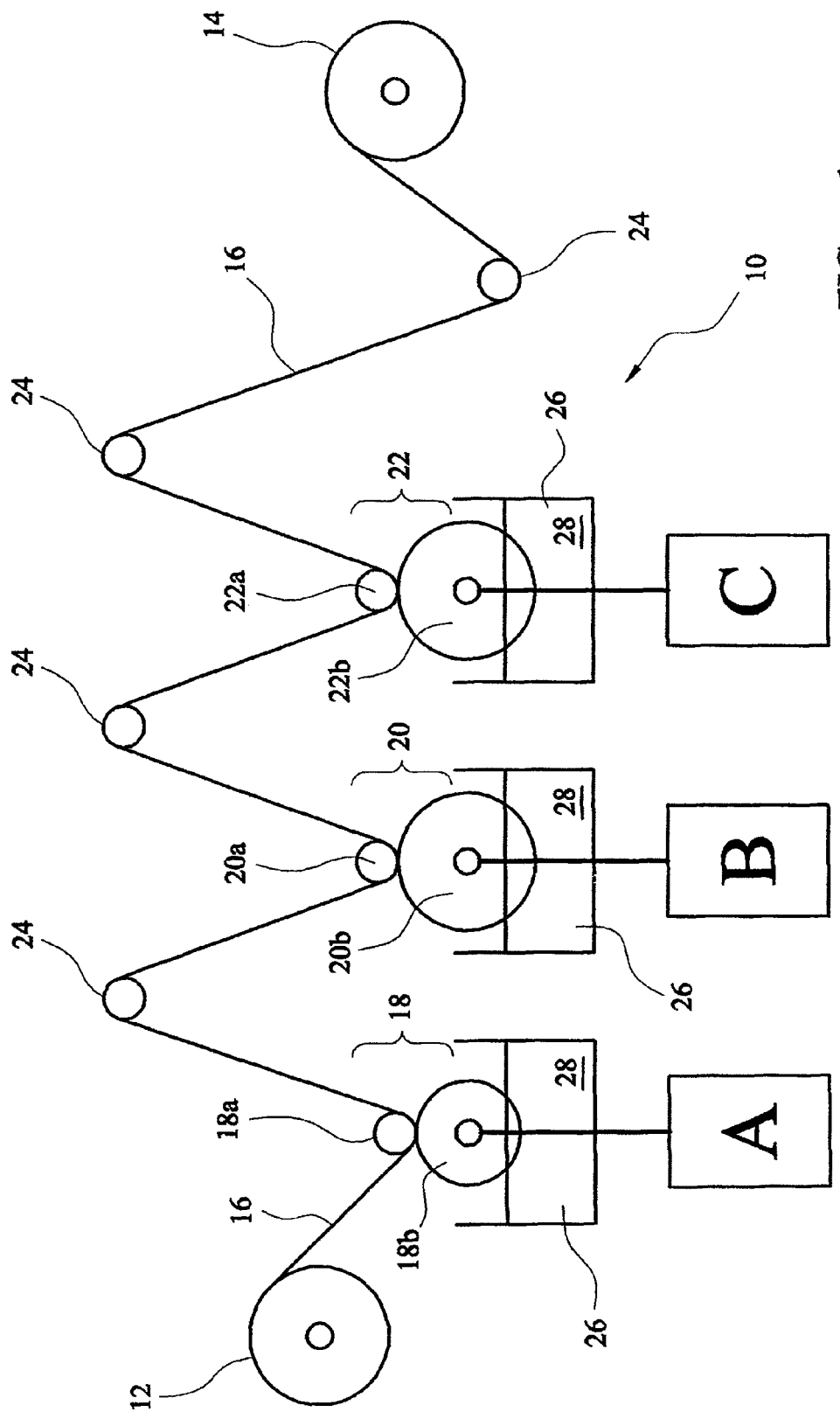
FIG. 1 shows schematically a multi-stage printing apparatus in which at stages A, B and C different indicia are combined to form a plurality of unique composite indicia on a sheet of labels in accordance with a first embodiment of the invention.

Turning to FIG. 1, this shows generally at 10 a multi-stage printing apparatus for forming unique composite indicia or markings in the form of labels which can then be attached to articles (not shown). The apparatus 10 comprises feed and take-up rollers 12, 14 between which extends a paper web 16 on which are to be formed labels, each containing a unique composite indicium. Pairs of print rollers 18, 20 and 22 respectively form the stages A, B and C, and guide/tensioning rollers 24 guide and tension the web as it transfers from feed roller 12 to take-up roller 14.

Each of the stages A, B, C has an ink reservoir 26 containing ink 28 and comprises a pressure roller 18a; or 20a, or 22a and a gravure cylinder 18b, or 20b, or 22b. As the web 16 passes between the pressure roller 18a and print cylinder 18b, for example, it becomes printed according to the pattern on the cylinder 18b. The same is true of the other stages.

Figure 2:
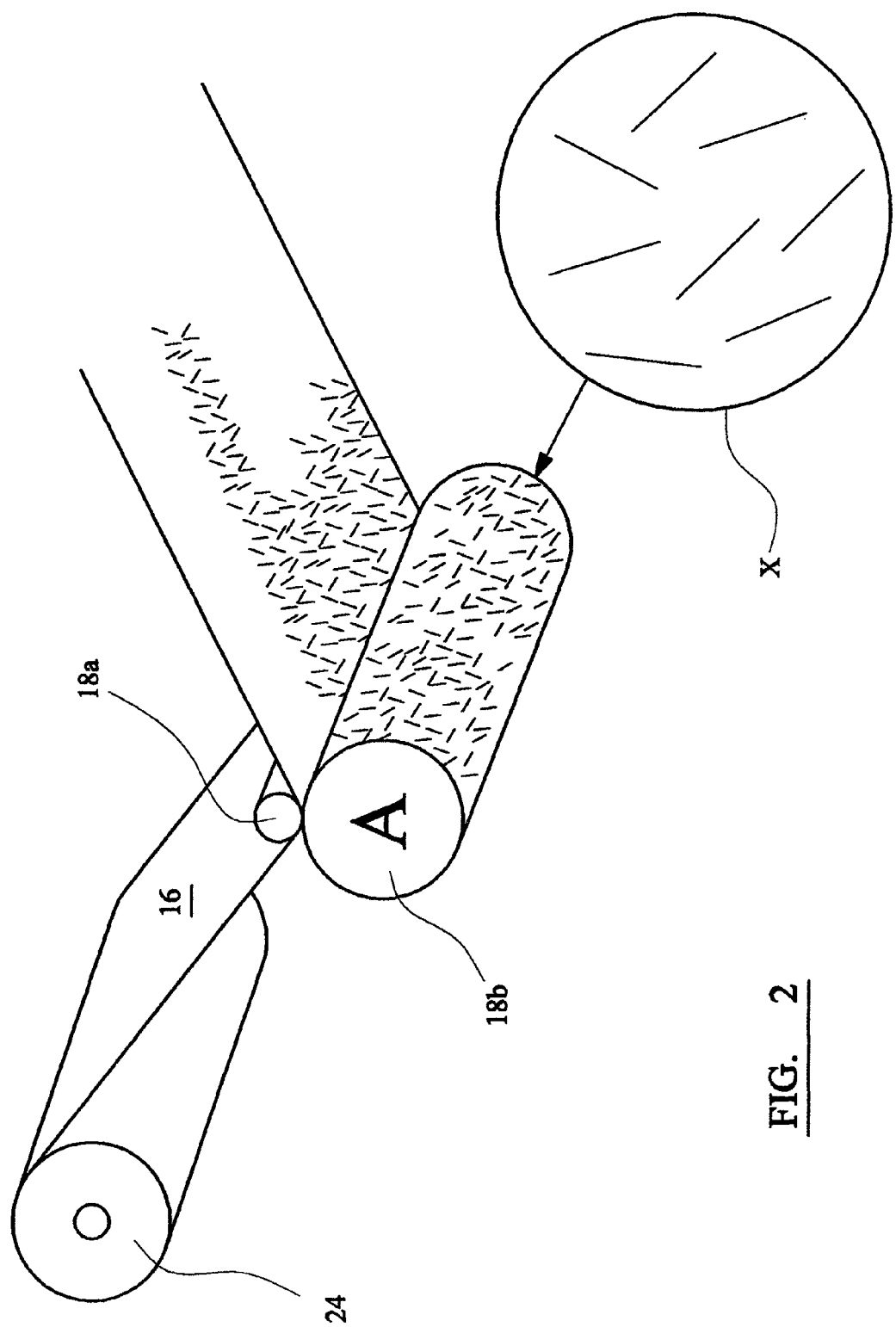
FIG. 2 shows in more detail stage A of the multi-stage apparatus of FIG. 1.

FIG. 2 shows in more detail stage A, with the web 16 passing between pressure cylinder 18a and gravure cylinder 18b. The cylindrical print surface of cylinder 18b has a pattern which is shown in FIG. 2 as a number of short oblique lines. The web 16 is thus printed with a pattern of lines, having a repeat that is a function of the circumference of the cylinder 18b. The insert X shows in closer detail a portion of the print pattern on the cylinder 18b.

Figure 3:
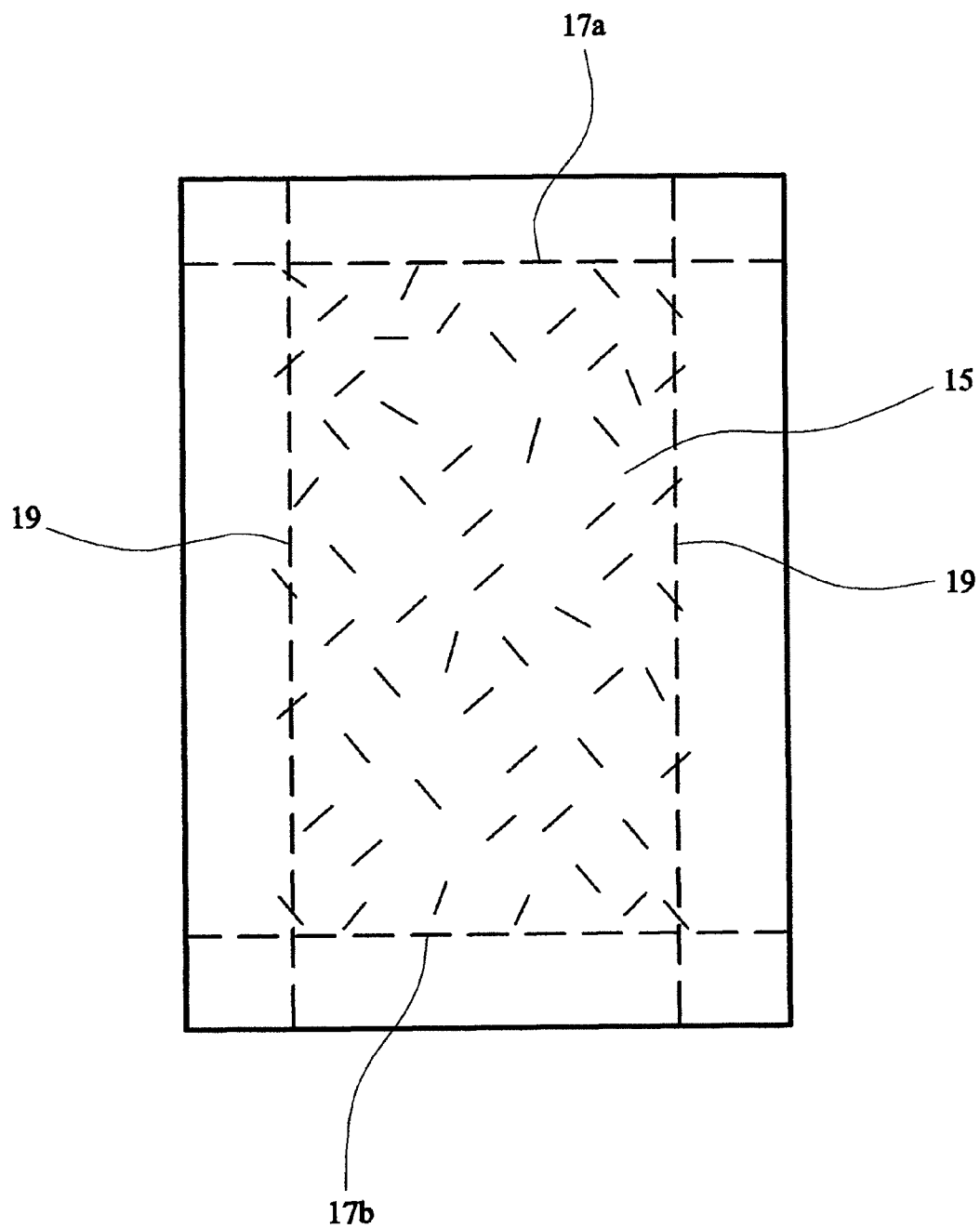
FIG. 3 illustrates a two-dimensional pattern that may be used with the printing apparatus of stage A of FIG. 2.

Generally, to allow printing of a continuous pattern, the print surface of cylinder 18b includes a pattern that is continuous and unbroken about the circumference of the cylinder 18b. FIG. 3 illustrates a two-dimensional pattern 15 that may be used to provide a corresponding pattern across the print surface of cylinder 18b. To achieve a continuous and unbroken pattern on the cylinder surface using the pattern 15, the individual elements of the pattern 15 are arranged across an area having dimensions corresponding to the dimensions of the print surface and in such a way as to not extend through the transverse edges 17a, 17b of the pattern 15. The elements may extend through the longitudinal edges 19 of the pattern 15 without causing a break in the pattern on the print surface. The pattern 15 is extended across the surface of the cylinder 18b and the two transverse edges 17a, 17b brought in contact with one another to provide a cylindrical print surface free of partially-formed pattern elements in the area where the edges 17a, 17b meet, although the pattern may include partially-formed pattern elements at the ends 21 of the cylinder 18b.

Figure 4:
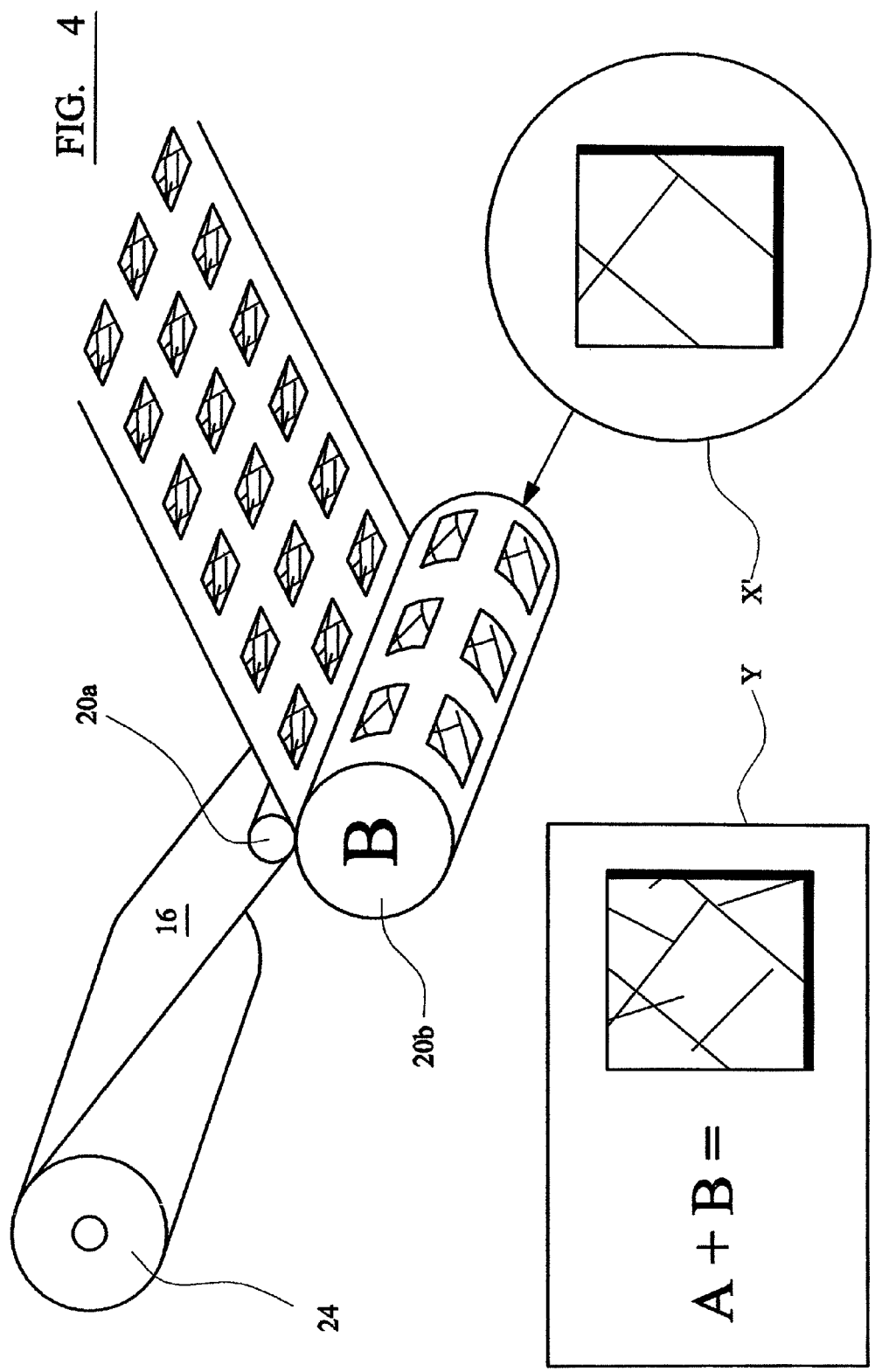
FIG. 4 shows in more detail stage B of the apparatus of FIG. 1.

FIG. 4 shows in more detail stage B. The web 16 passes between pressure roller 20a and gravure cylinder 20b, the latter imparting a second print pattern onto the web. The print pattern on the cylinder 20b comprises a series of discrete simple indicia shown in FIG. 4 in the form of a square box containing a number of oblique lines. The simple indicia are all identical in FIG. 4, but they could, alternatively, be different. The print pattern produced could be similar to that produced by cylinder 18b in step A. One or more pattern elements of the simple indicia are differentiated from the remaining elements, shown here as two adjacent sides of the box that are emboldened, to provide a reference for orienting the indicium. Alternatively, a reference line may be printed inside the indicium, offset to one side. Also, the rest of the surface of the cylinder 20b may contain a blanking background which covers the spaces between the box-like indicia on the web so as to conceal the surplus lines from the first printing stage. The blanking background could be arranged to cover part of the indicium, to provide a reference bar by rendering part of the indicium invisible. Any blanking background may be provided in addition to or instead of this by printing step C, see below. Insert X' shows one of the simple boxlike indicia in more detail. Insert Y shows the composite indicium on the web after stages A and B.

The composite indicium could be any shape, for example any polygon or a circle. The composite indicium of FIG. 4 is a square containing a plurality of oblique lines. No two of the composite indicia are precisely the same because of the variance in the pattern of lines from stage A, and because the pattern of boxes from stage B, while also periodic, is out of phase with the pattern of stage A. It is desired to maintain the pattern of stage A out of phase with the pattern of stage B for an extended number of revolutions of the cylinders to increase the number of unique composite indicia that are printed.

Repetition of the composite indicium, which may occur as a result of the cylinders revolving in phase, can be avoided using various techniques. As an example, if a plurality of cylinders are used, at least one of the cylinders may be driven at a different speed relative to the speeds of revolution of the remaining one or more cylinders. As another example, the diameter of the cylinders can be made different. The cylinder diameters or circumferences may be chosen such that the relationship between them ensures that they will not come back into phase, and hence begin to duplicate the indicia, before they have worn out. More particularly, if one of the cylinders has a diameter or circumference which is a prime number in the units of measurement of the diameters of the other cylinder(s), a number of unique composite indicia sufficient for most applications will be provided before the patterns on the cylinders come into phase again. In varying the circumferences, slight differences in circumference (e.g. 600.7534 mm as cylinder A and 601.757 mm as cylinder B) can maintain the cylinders out of phase for a great number of revolutions. The lifetime of most rotogravure print cylinders (before the printing surface becomes unusable) is approximately 1 million revolutions, and a careful choice of diameters will ensure that the cylinders do not come back into phase within the lifetime of the cylinders.

An advantage of using print cylinders is that their transverse position in relation to the web 16 can be adjusted every time the roll of web is changed, to give a greater number of combinations of indicia.

When the second indicium is a fixed pattern of lines, together with a border (e.g. as shown in FIG. 4) this may be applied either by a cylinder (such as 20b) in which case the pattern may be repeated around the print surface of the cylinder, or else may be applied by other printing means, including digital printing means such as an inkjet printer. In either case, care should be taken to ensure that the printing of the second part of the indicium does not take place in precisely the same position relative to the cycle of the print cylinder printing the first part of the indicium for successive articles. In other words, the period of printing successive second, fixed indicia should not be the same as the period of variance of the indicium (from the first print cylinder), nor should the latter be an exact multiple of the former. This is to ensure that no composite indicium is repeated.

Figure 5:
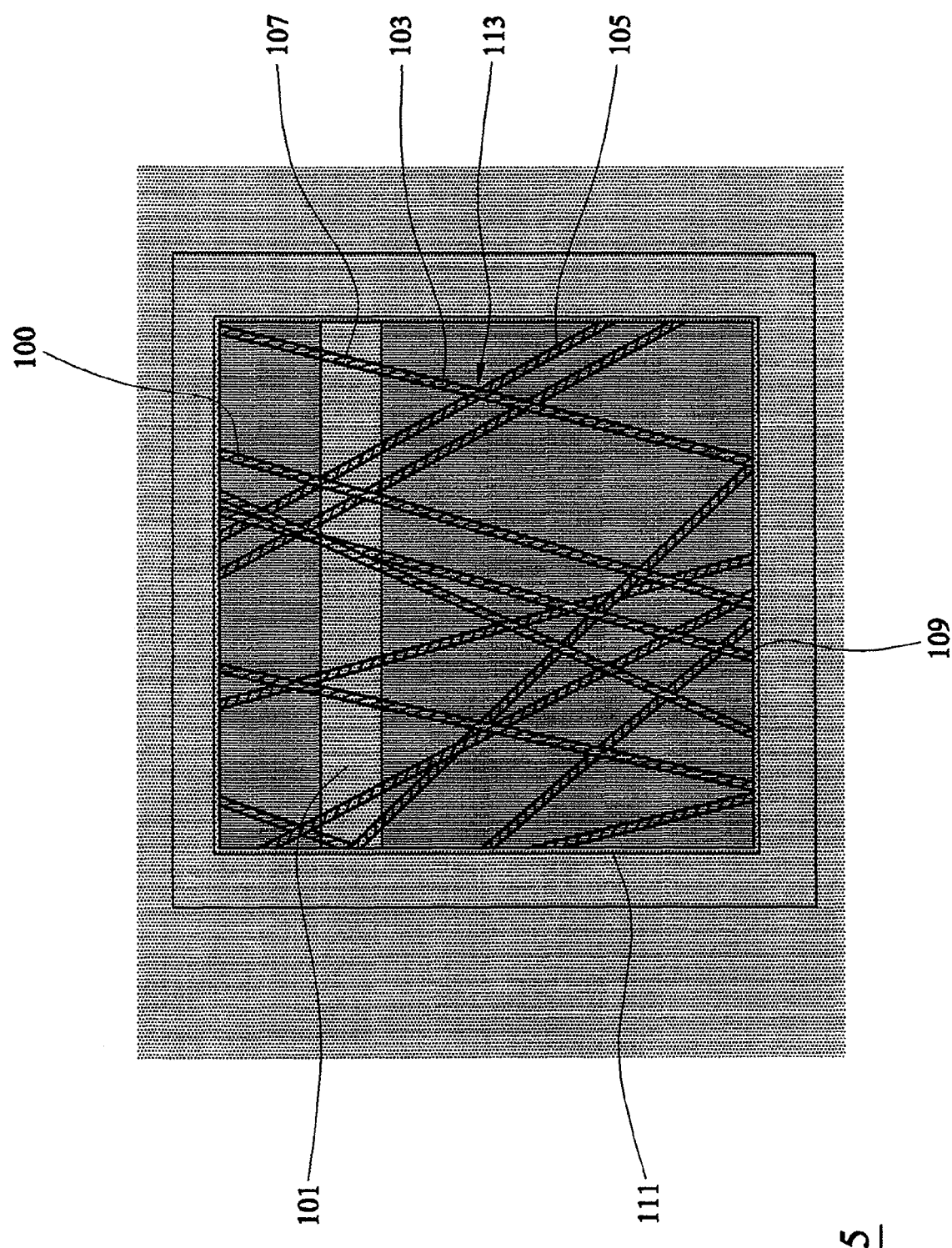
FIG. 5 shows an exemplary composite indicium that may be printed by stage A and stage B as shown in FIGS. 2 and 3.

FIG. 5 shows an exemplary composite indicium 100 that may be printed by stage A (e.g. cylinder 18b) and stage B (e.g. cylinder 20b) as shown in FIGS. 2 and 4. Composite indicium 100 comprises a plurality of oblique lines such as oblique lines 103 and 105. In this example, a reference bar, or boundary condition 101 has been included in the blanking background (shaded gray in this example). An orientation of indicium in any subsequent reading of the indicium is provided by identifying the reference bar 101 and borders 109 and 111 (a more detailed discussion on the reading and orientation of an indicium is provided later). Minutiae of composite indicium may be associated with intersections of different oblique lines such as oblique lines 103 and 105 (corresponding to intersection 113). In the embodiment, a location of an intersection (e.g. the coordinates of the intersection in relation to a reference frame that may be provided by borders 109 and 111) may be related to a unique code (e.g. an alphanumeric character string) that is associated with composite indicium 100. In the embodiment, composite indicium 100 may be scanned along reference line 101, which comprises a strip of composite indicium 100. Because of the nature of the minutiae of composite indicium 100, only a portion of composite indicium need be processed in order to determine the corresponding information (e.g. a code that may be derived from composite indicium 100 as will be discussed). When processing reference line 101, each oblique line is located in order to derive a corresponding standardized, i.e. averaged, normalized, reduced or substantially one-dimensional line (e.g. line 107 being associated with oblique line 103) that is further processed. In the embodiment, in order to derive a standardized line of an oblique line, an image of the oblique line is statistically processed to identify a center of the oblique line.

Figure 6:
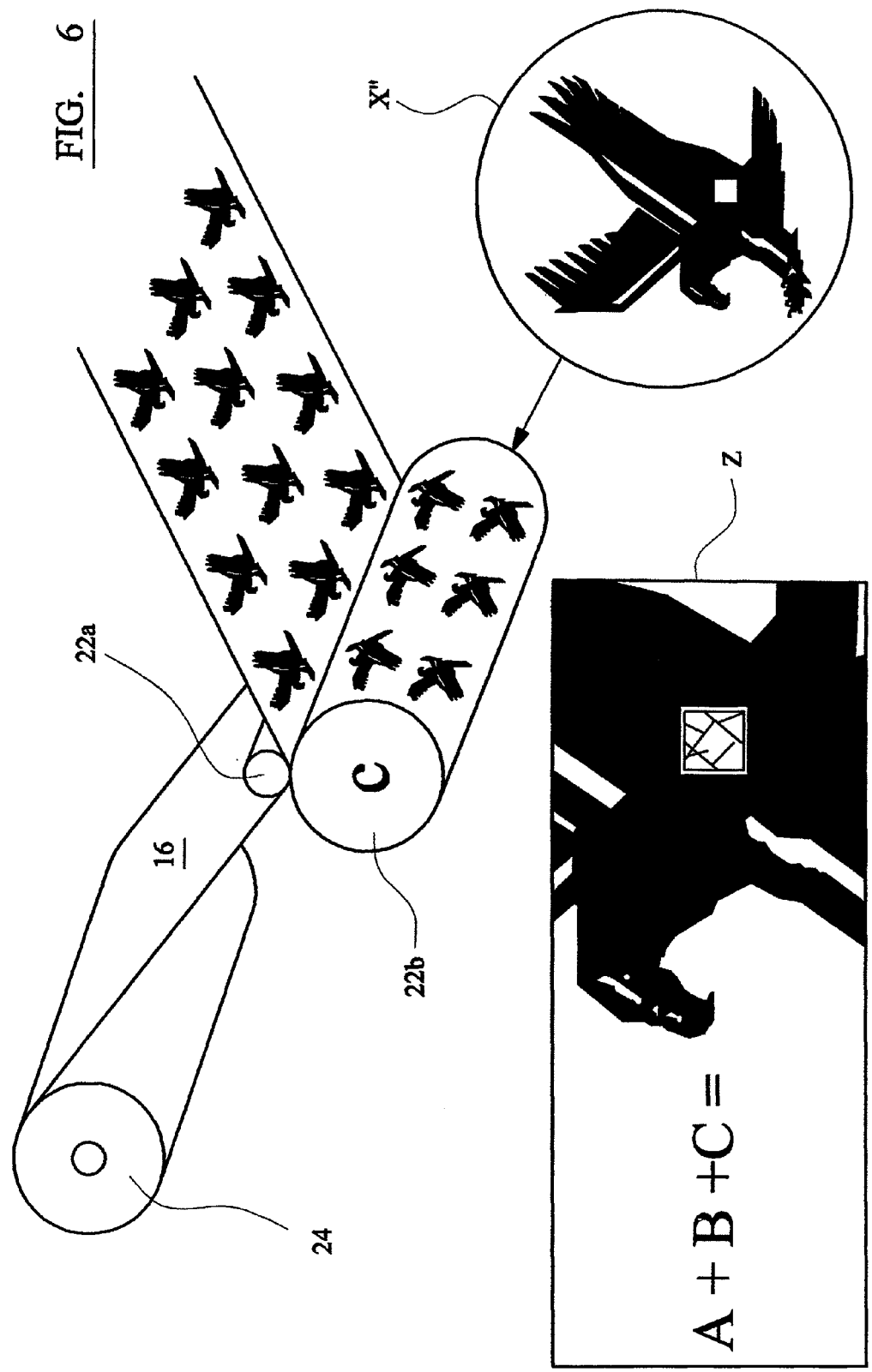
FIG. 6 shows in more detail stage C of the apparatus of FIG. 1.

FIG. 6 shows an additional third printing stage C in which the web 16 passes between pressure roller 22a and print cylinder 22b. In this stage, as is shown in more detail in the insert X", the print cylinder 22b imparts a commercial graphic onto the web, shown as an eagle in the figure. The eagle device has a blank square or window therein which, when the web is printed at stage C, registers with the composite indicium from the previous print stages, to produce the image shown in box Z. The indicium may be incorporated into the graphic, for example in some lettering. Printing this graphic may provide the image with a border if no other border is printed. This print stage may also provide the indicium with a reference bar, or boundary condition, which facilitates the orientation and recognition of the indicium, when it is subsequently read. This reference bar may be a line printed on the indicium, or may be part of the blanking background, which is printed over a portion of the indicium. When the indicium is subsequently read this reference bar also provides a camera in a reading device with something on which to focus.

Another embodiment will now be discussed with reference to FIGS. 12 through 15. With a variation of the embodiment, rather than an unchanging second part of the indicium (i.e. stage B in FIGS. 1 and 4), the second part may also be variable, i.e. can be generated such that successively printed ones are different. This may be achieved in a similar manner to the printing of the first part of the indicium (stage A). In this case the second part of the indicium may be formed using a print cylinder, having a pattern of elements, such as dots, ellipses, polygons or lines on it. A separate step of printing the border or any reference line (as mentioned above) may be necessary when using this approach.

Figure 12:
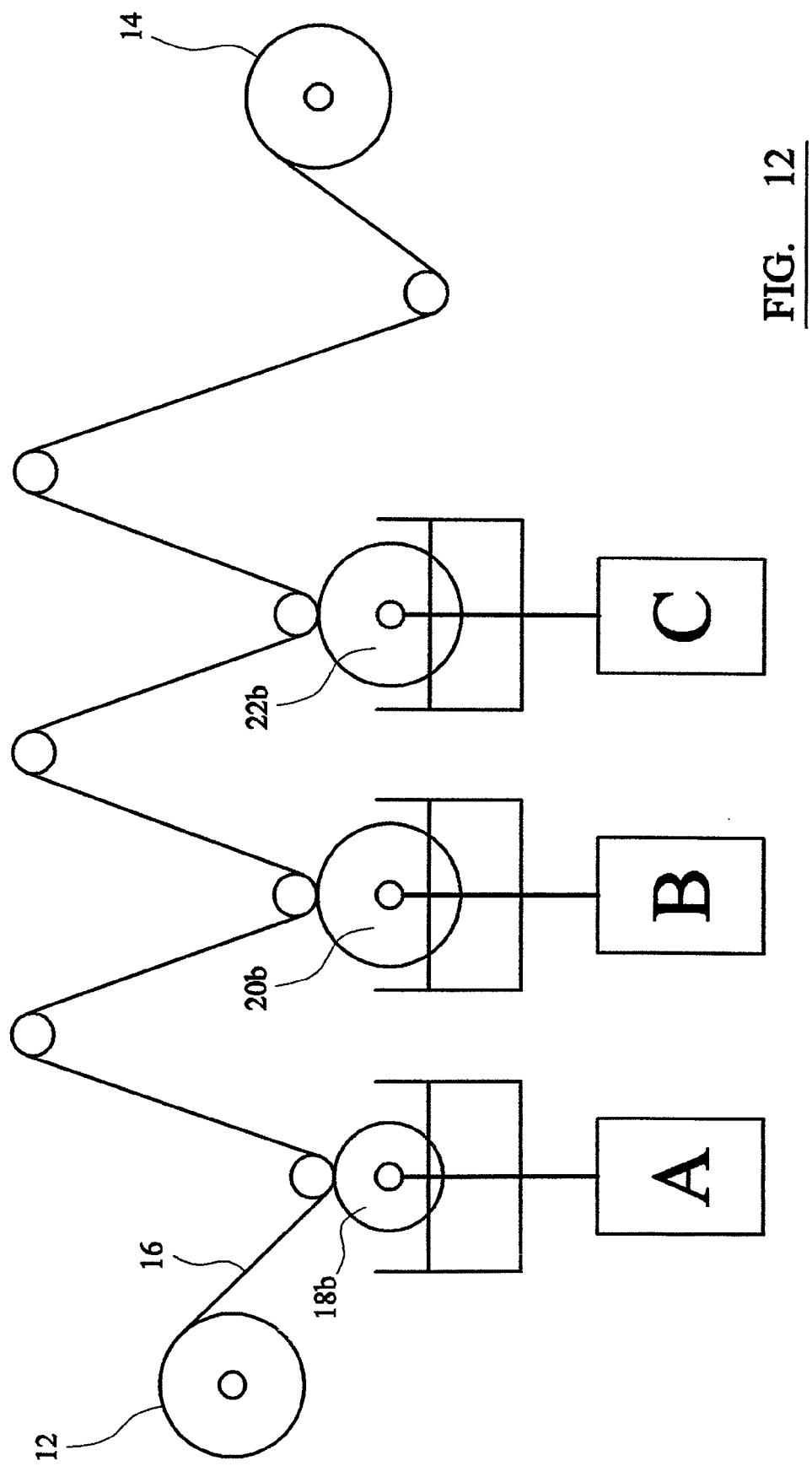
Figure 13:
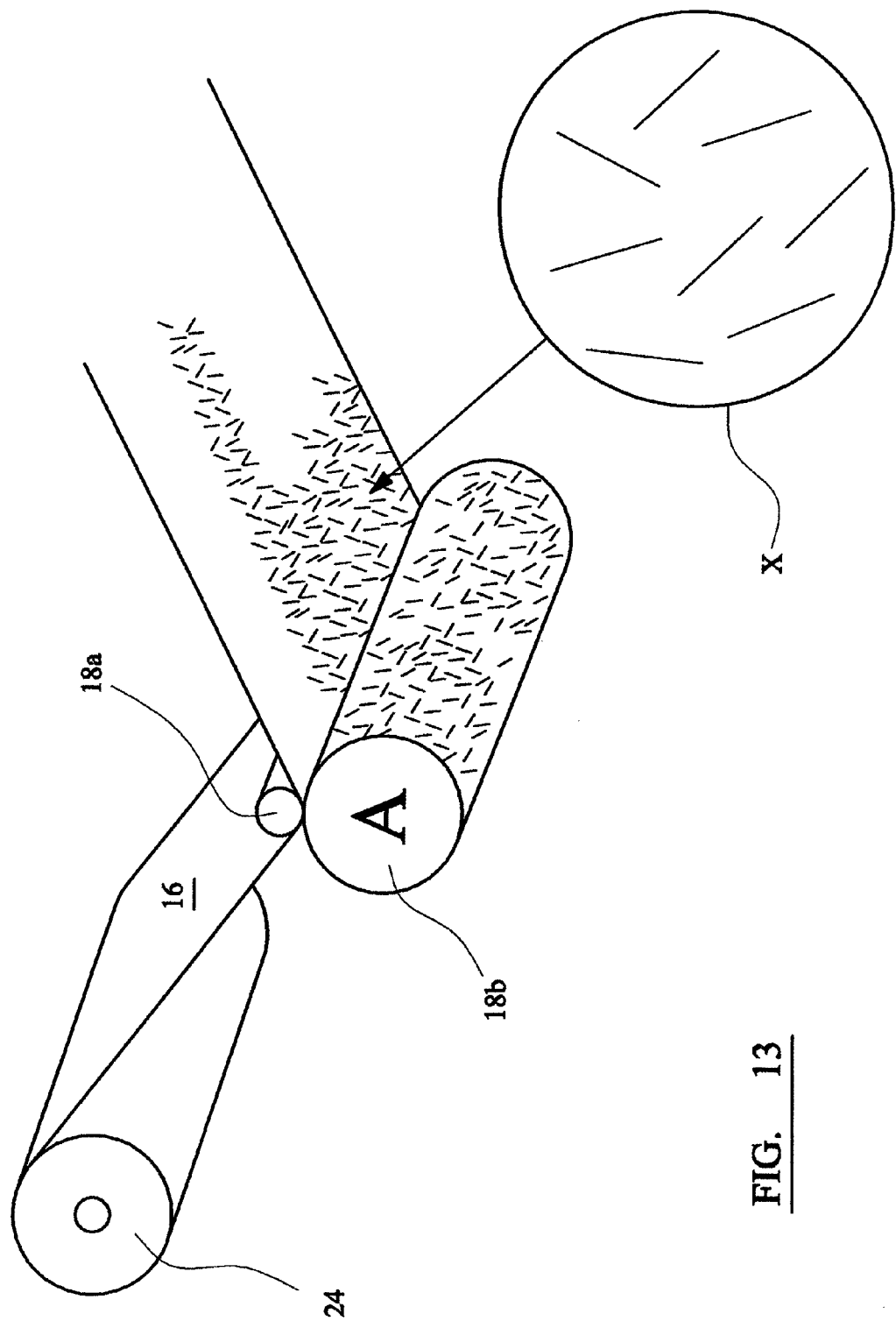
Figure 14:
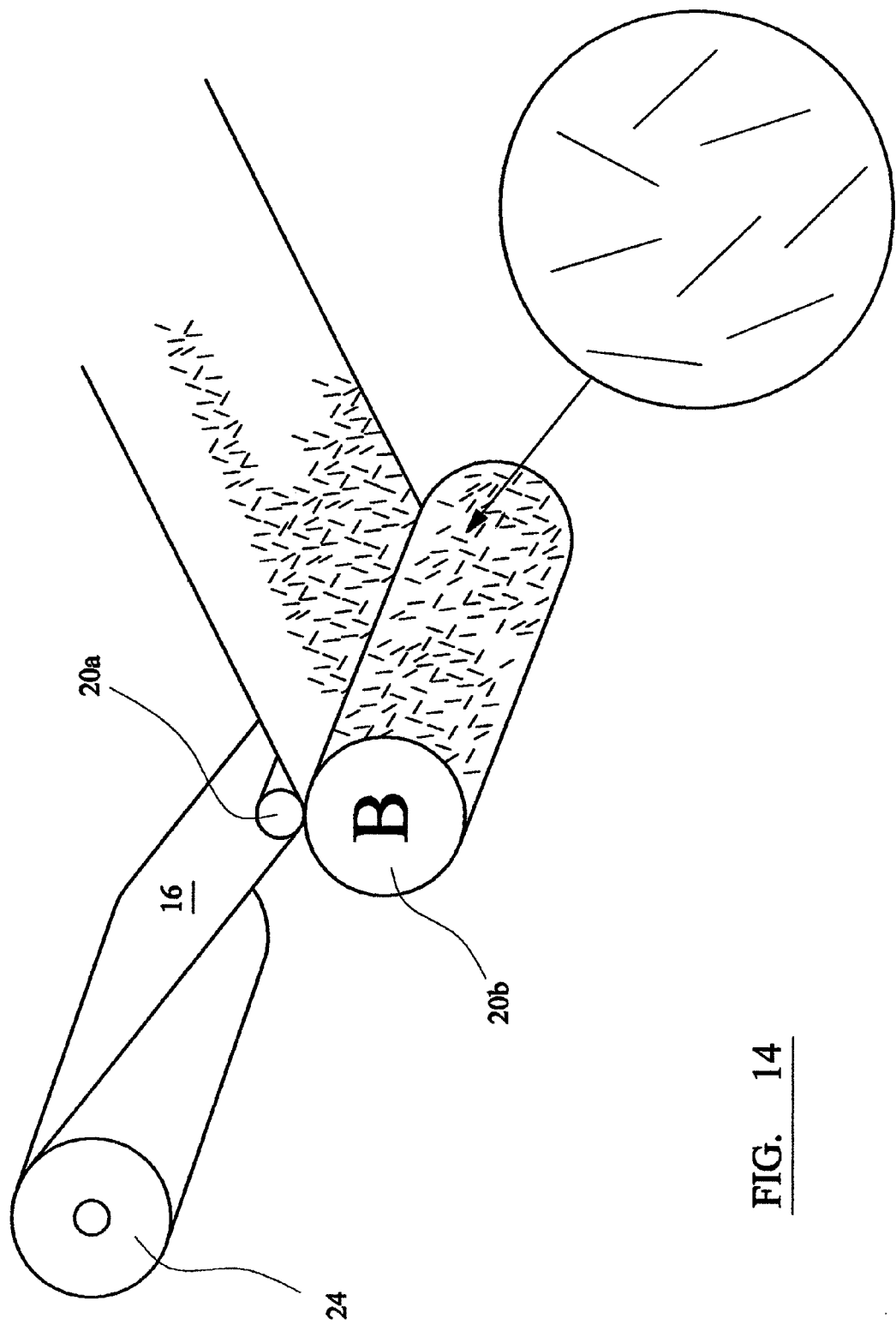

FIG. 12 shows generally at 46 another multistage printing apparatus. This is similar to the apparatus of FIG. 1, and like reference numerals are used for like features. However, in this embodiment the second stage (B) print cylinder 20b has another pattern of short oblique lines, somewhat similar to that of the first stage (A) cylinder 18b (see FIGS. 13 and 14). The web 16 is thus printed with two patterns each of which varies with respect to each other, as well as with respect to the resulting composite indicium, as the cylinders revolve and the combination of the two patterns is a complex superimposition of lines in this case. As described above in connection with the embodiment of FIG. 1, the two cylinders 20b and 18b are of different diameters selected to ensure that a very large number of revolutions must take place before the cylinders may be in phase again, and thus before there is any risk of the same composite indicium being formed. At stage C the commercial graphic is again printed, and this forms a border for the composite indicium. As an interim step, prior to printing at stage C, a blanking print may be applied to the web leaving only the required portions of composite indicia and blanking other parts of the pattern. This blanking print step may also provide a reference bar, or boundary condition on the indicium, as mentioned above.

In FIG. 15 the insert X''' shows the commercial graphic being printed on the web by cylinder 22b, and insert Z' shows the combined effect of the three print stages A, B and C. This embodiment, in which the composite indicium is formed from two indicia, each of which varies for the composite indicia, provides an even greater number of unique composite indicia. The cylinder printing the second part of the indicium could be the same cylinder as that which printed the first part of the indicium in which case the article to be printed would have to be brought into contact with the print cylinder 18b twice. Alternatively, a second printing apparatus, which may comprise a second print cylinder 20b, also can be used, as shown in FIG. 12.

When the composite indicium has been printed, it may then be recorded, or logged, at any time before it is needed. This can be done by optically scanning the indicium to capture digitally the image and using a computer to calculate a mathematical property of the indicium that may be a function of the spatial relationship between at least some of the elements of the indicium and/or between the elements and a border, or using the characteristics of the so-called minutiae such as in known fingerprint recognition techniques. An algorithm is then applied to this data, which converts the indicium into a code (e.g. a number). This code can be stored in a database together with information relating to the article. In the embodiment, information may be send to and retrieved from the database using the Internet, an Intranet, a radio frequency identification (RFID)-capable interface, or a wireless service such as a short message service (SMS).

Referring to FIG. 5, minutiae of composite indicium 100 are utilized to determine a unique alphanumeric code that is associated with the composite indicium. Two reference lines (e.g. oblique lines 103 and 105) may cross at an intersection (e.g. intersection 113). The coordinates of each intersection provide a component of the unique code. As an exemplary illustration of the embodiment, a unique code may be determined by concatenating the (x,y) coordinates of the intersections. For example, with two intersections having coordinates $(x_1,y_1)$ and $(x_2,y_2)$, a code may be determined by a concatenation $x_1 x_2 y_1 y_2$. The range of the code may be extended with more possible intersections. As an example, with $(x_1,y_1)$ corresponding to (0.013 units, 0.071 units) and $(x_2,y_2)$ corresponding to (0.051 units, 0.083 units), the corresponding code may be obtained as a concatenation 13517183, where each coordinate is multiplied by 1000 in order to obtain whole numbers.

FIG. 16 shows an exemplary database entry 200 relating a code (e.g. number) 201 derived from a composite indicium (e.g. indicium 100) and information about an associated article, in accordance with an embodiment of the invention. For example, in the case of fast moving consumer goods (FMCG), a human readable (HR) number 203, a time stamp 205, a date 211, a location of manufacture 209, brand type 207, the batch number and the best-before-date (if any) may be recorded. The data may also be encrypted, thinned or compressed by suitable means before storage.

The data is stored in a database in a central storage computer, accessible by, for example, the Internet. When the indicium on the article is subsequently read, a computer converts the optical data to a code, using the same algorithm. The computer then looks up the code in the database and recalls the information stored under the code. Thus, counterfeit goods having a false indicium would be discovered, since no computer record (or an obviously incorrect record) would be found. Many goods having copies of the same indicium would also be found not to be genuine. A system could be arranged to set off a warning if the same indicium is read in two different places, or if the same indicium is read in the same place at different times; both of these situations would indicate the presence of a counterfeiter.

If sufficient detail is taken from the composite indicium initially, the process of recalling the information should remain accurate even in cases where the indicium has been degraded, or up to about 70% or possibly more of it is missing by utilizing redundant characteristics of the indicium. The redundancy of the characteristics may be about 85%.

With a variation of the embodiment, a selected code (e.g. an alphanumeric number) may be processed so that minutiae of a generated composite indicium correspond to the selected code. (As previously discussed, a code is determined from the composite indicium. In the variation of the embodiment, a composite indicium is determined from the selected code.) As an example, the selected code may be expressed as a number $x_1, x_2, \ldots, x_n, y_1, y_2, \ldots, y_n$. From the number, one may determine (x,y) coordinates of element intersections (e.g. where lines intersect) in order to construct a composite indicium having a corresponding minutiae. Furthermore, a corresponding image of the composite indicium may be processed by a processing technique such as compression and encryption techniques. For example, an amount of transmitted data may be reduced by compressing the image using compression software that supports JPEG (Joint Photographic Experts Group) standards. The constructed composite indicium may be subsequently analyzed (as discussed in the context of FIG. 5) to obtain the selected code. The variation of the embodiment, as discussed herein, may be utilized to convey information between two communicating parties by determining a selected code, constructing a corresponding composite indicium, communicating a signal that conveys the composite indicium, and analyzing the composite indicium in order to obtain the selected code.

Figure 19:
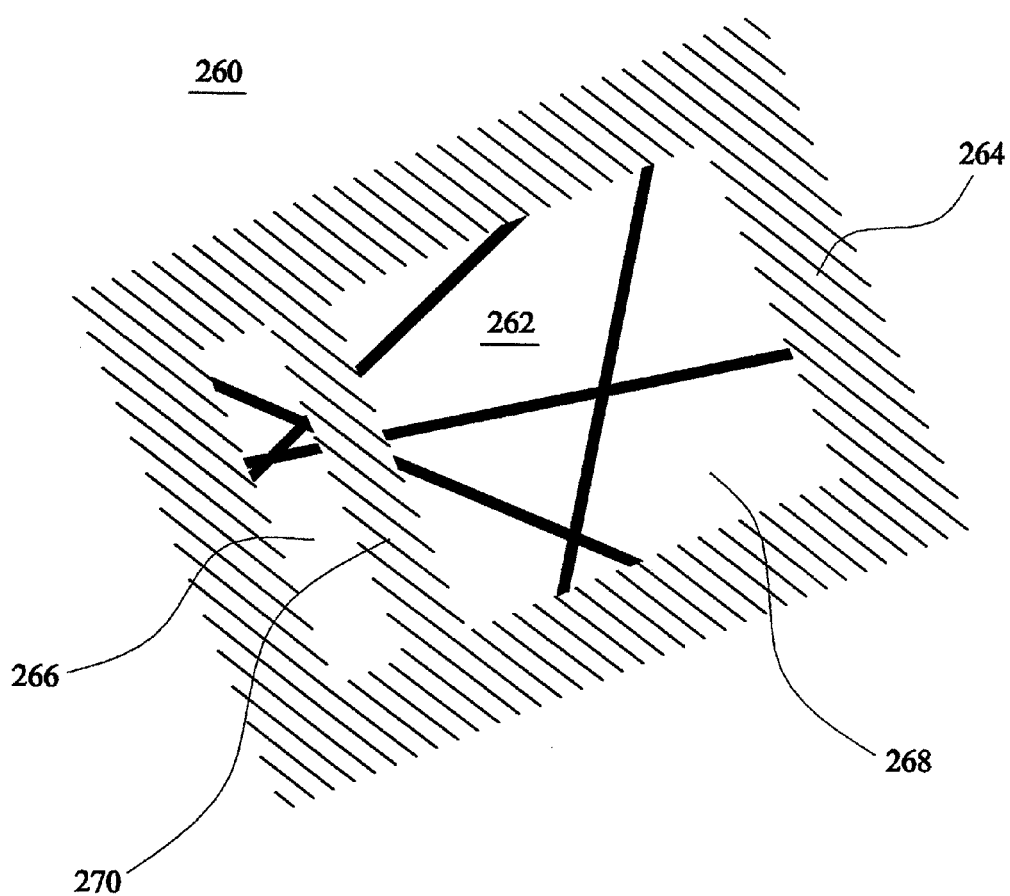
FIG. 19 shows a randomly oriented composite indicium applied to packaging.
Figure 20:
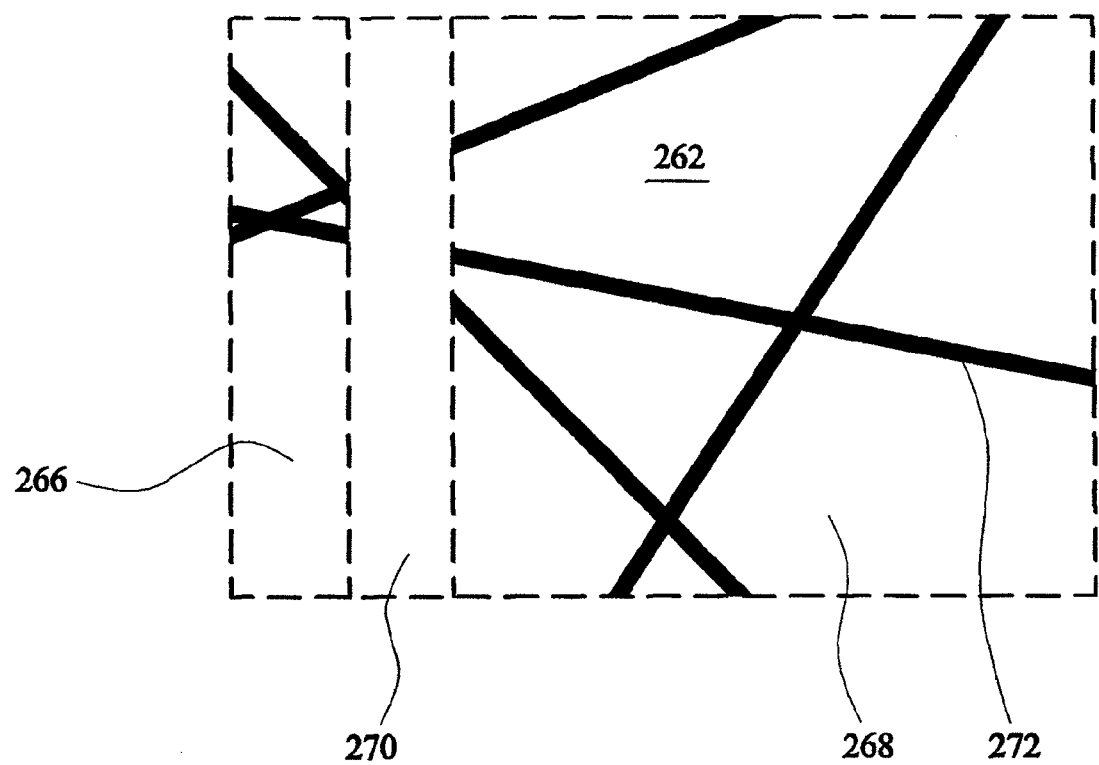
FIG. 20 shows the indicium of FIG. 16 as it is recognized by a reader.
Figure 21:
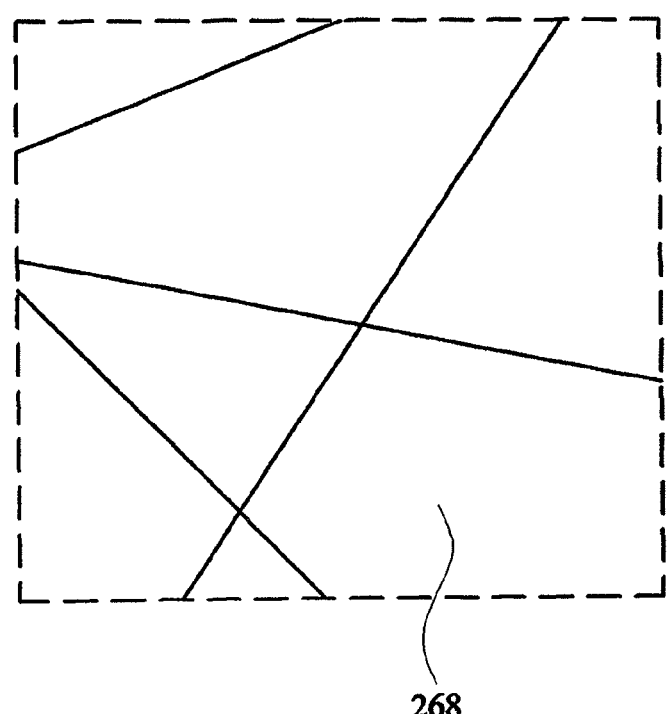
FIG. 21 shows the indicium of FIG. 16 refined by the reader.
Figure 22:
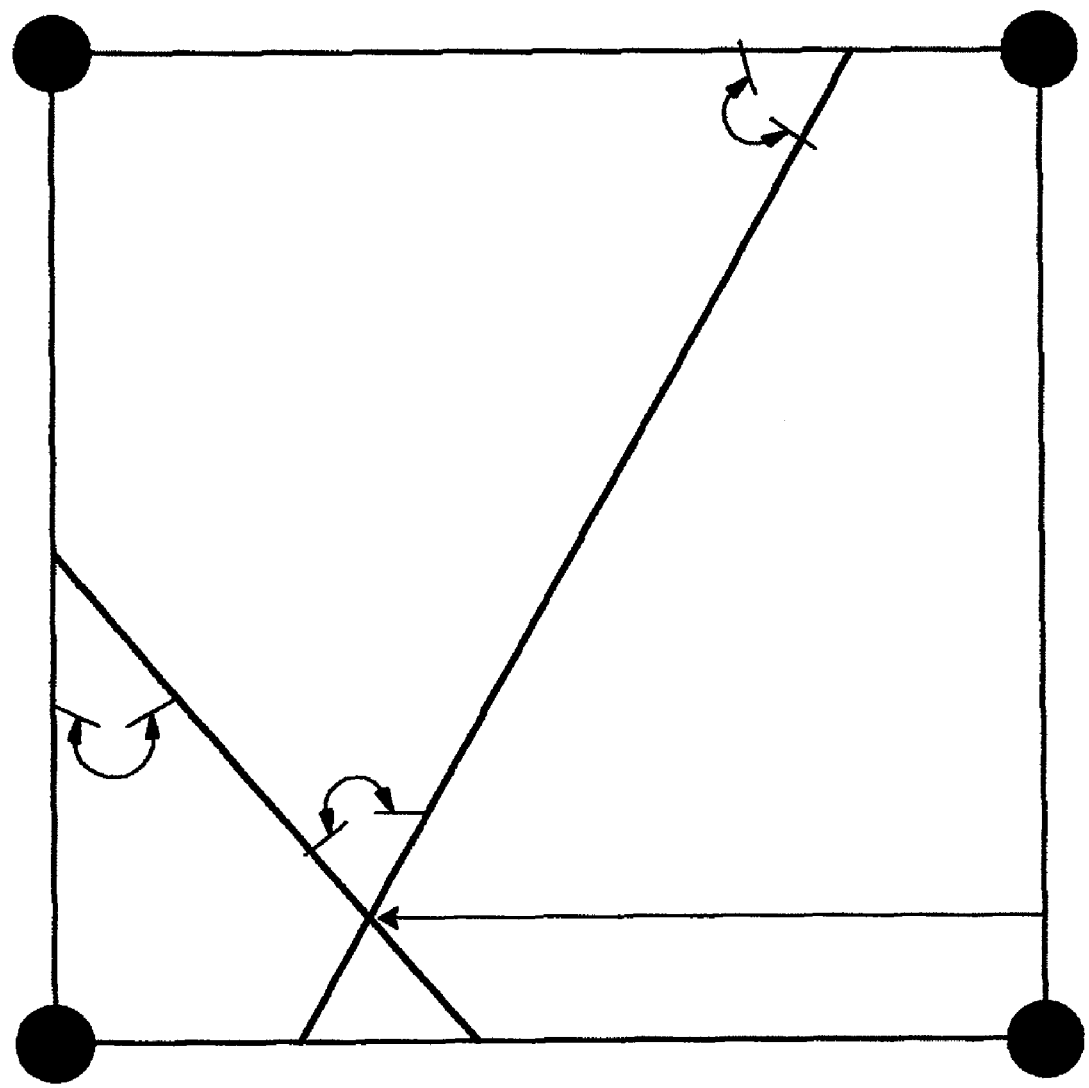
FIG. 22 shows an indicium information diagram.
Figure 23:
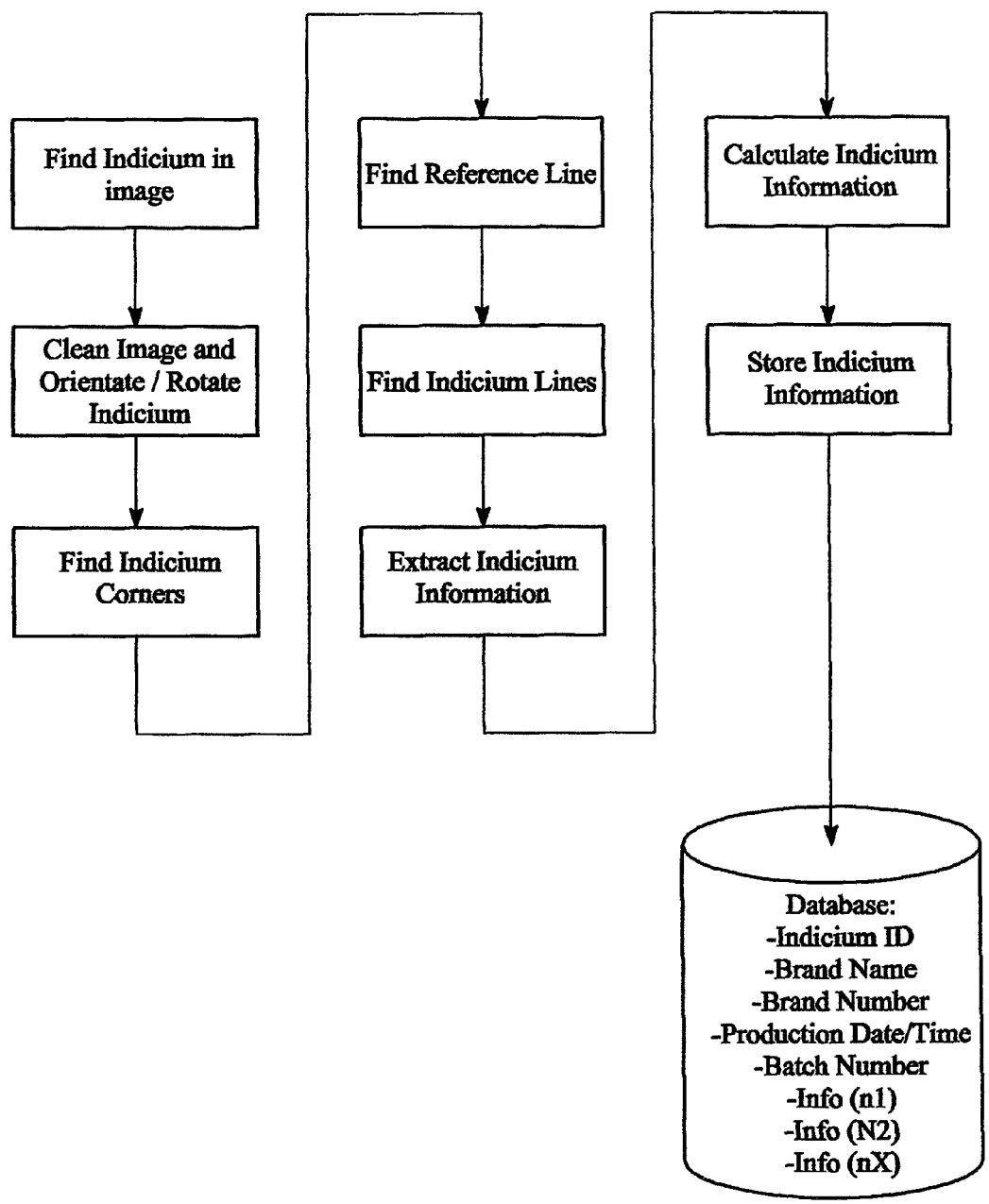
FIG. 23 is a flow diagram showing the process of recognizing the indicium and storing information in a database.

FIG. 19 shows a portion of an article 260 having a composite indicium 262 applied thereto. The article has been overprinted with a suitable logo or commercial graphic 264, shown by the hatched lines. This graphic has been printed so that the indicium is divided into a smaller portion 266 and a larger portion 268 by a part of the graphic 270, which provides a reference characteristic. The composite indicium may be in any orientation on the article. As described above, when the composite indicium has been applied to an article, information relating to that article is stored in a database, corresponding to the indicium applied to that article. First, the composite indicium is read by a camera connected to a computer. The camera may be arranged to view a predetermined portion of the article, such as the portion shown in FIG. 19. The camera scans the predetermined portion for the composite indicium. The camera may be arranged to focus on the reference bar. If the camera is not properly focused on the composite indicium, large errors may be introduced into the calculations and recognition. Software stored in the computer finds the edges of the indicium and the reference bar, on the image read by the camera. This allows the computer to orient the composite indicium, and ignore the commercial graphic printed on the article, as shown in FIG. 20. Providing the indicium with a rectangular shape also facilitates the orientation of the indicium. In this example, the computer also orients the indicium so that the smaller portion 266 of the indicium is on the left, as shown in FIG. 19. The software may also magnify the indicium. Once the indicium 262 has been oriented the software discards the reference bar 270 and the smaller portion 266 of the indicium, so that only the larger portion 268 of the indicium remains. The indicium shown in FIGS. 19 to 21 is made up of lines 272. The software may substantially reduce the width of the lines remaining in the larger part of the indicium, so that they are virtually one-dimensional. This may be done by normalization, averaging or any other suitable method. Reducing the width of the lines in this way reduces any possible error which may be associated with the thickness of the lines. The remaining indicium is shown in FIG. 21. Various mathematical properties of this indicium are then calculated, as shown in FIG. 22. Two lines from the indicium in FIG. 21 have been used in this example. The angles between the lines, and between the lines and the edges are calculated. A suitable algorithm is then applied to this data, to convert the data into an alphanumeric code. This code is then stored in a database, together with any other suitable information about the article to which the indicium is applied. This process of reading the indicium and storing information relating thereto in a database is shown in the flow diagram of FIG. 23.

Figure 24:
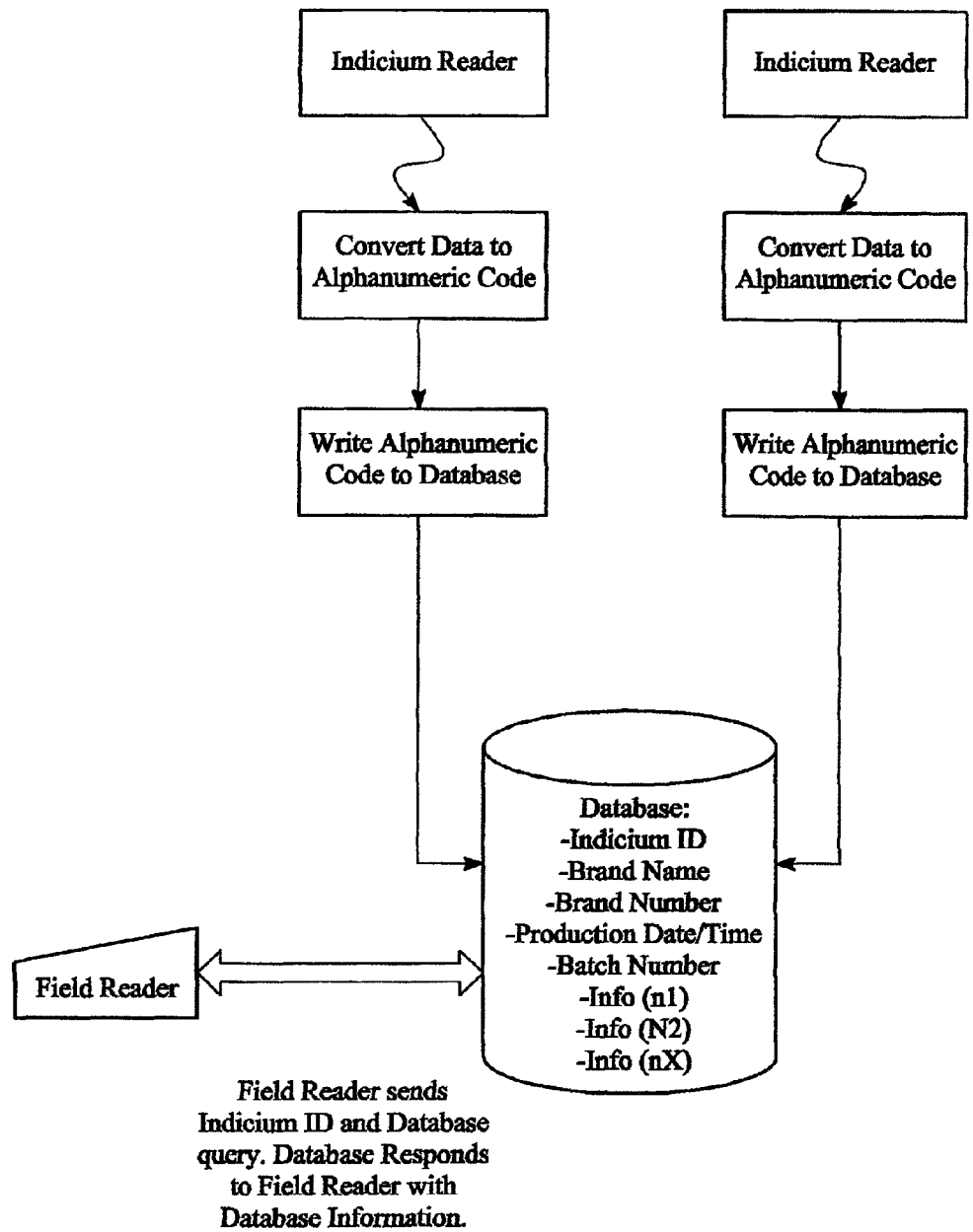
FIG. 24 is a flow diagram showing the process of retrieving information from the database.

Upon subsequent reading of the indicium, the reading camera and software find and process the code as above. The alphanumeric code is then determined from the indicium in the way discussed above. The database is then consulted (for example via any of the media mentioned above) to retrieve any information relating to that alphanumeric code. The information is then transmitted back to the reader. This process is shown in FIG. 24.

Figure 17:
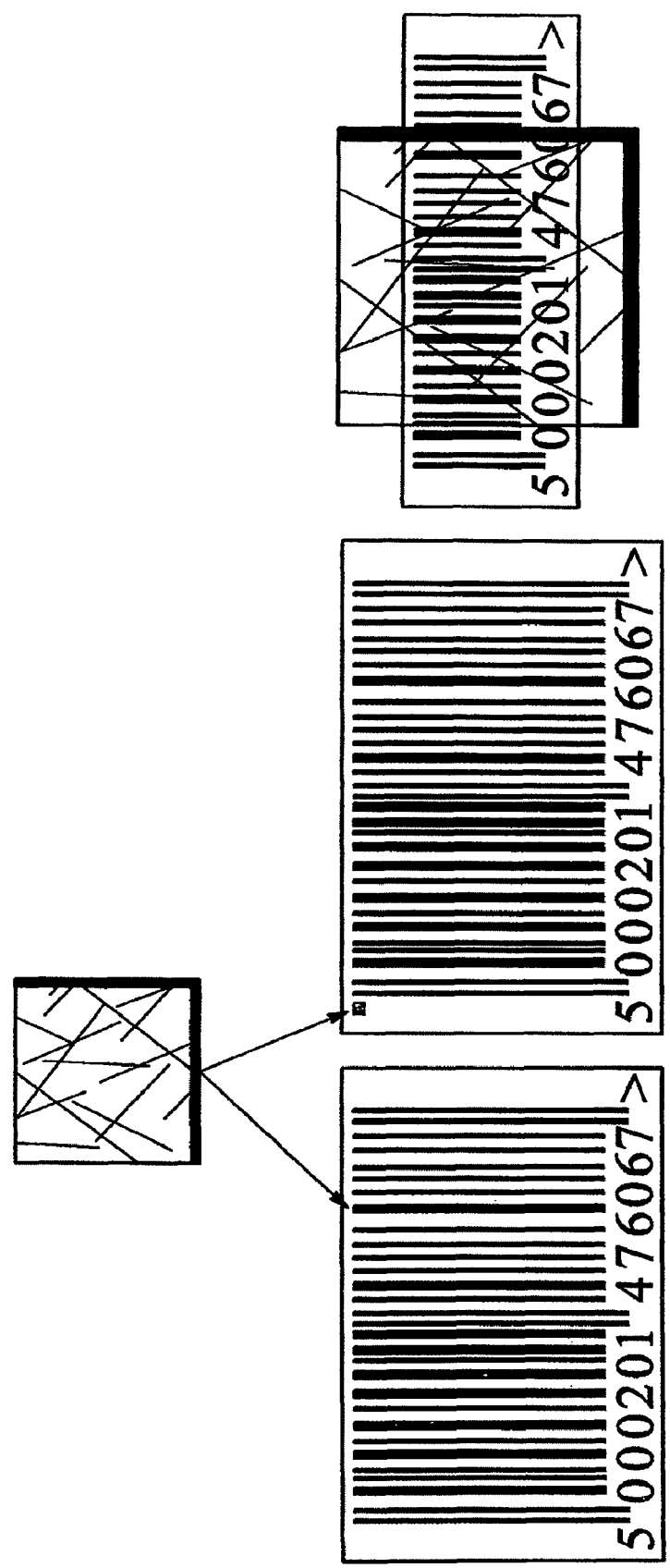
FIG. 17 shows examples of how a composite indicium might be combined with a conventional barcode, in accordance with an embodiment of the invention.

In other embodiments indicia, in accordance with the invention, could be incorporated into bar codes that are widely used to identify goods, for example, at the point of sale. An indicium may be printed inside one of the "bars", or else behind or over the bar code, if the indicium is printed in ultra violet or infrared ink, to enable goods to bear both a bar code and a composite indicium, thus remaining compatible with widely used equipment. FIG. 17 shows some examples of this. Though no information or data relating to the article or item need to be included or incorporated within the composite indicium (unique markings), the marking may be created to, nonetheless, incorporate information while still retaining a unique and abstract character. For example, combinations with a bar code as set forth in FIG. 17 or utilizing a color or other readable indicia may be employed. A color or number may thus be associated with a class of goods as an SKU code for example.

The data for indicia relating to items such as short-lived goods could be deleted after a suitable time period, thus reducing the amount of data to be stored.

Since the number of possible variations of the composite indicium is very large, perhaps $10^n$ or more, where n may be greater than 30, it is possible to provide a unique indicium, and therefore a unique identification code, for a very large number of articles. The number of possible unique identification codes depends on the number of elements such as lines, dots, ellipses or polygons and also on the diameter(s) of the print cylinder(s), if that printing technique is used. Use of zig-zagged lines, would also increase the number of possible unique identification codes. Furthermore, because of the simplicity with which the unique composite indicia may be printed onto articles, the indicia may be applied automatically at high speed with an existing print process. The indicia may be subsequently read in a fraction of a second by optical scanning means.

Invisible or covert coding is possible by printing the composite indicia in ultra-violet, magnetic, sonar, radioactive, or infrared viewable ink, for example. This is particularly useful where the appearance of the article would be impaired by printing a visible indicium on it.

The indicia may be holographic, metalised, or embossed and may be used as tax stamps and/or fiscal markers. Indicia could be printed onto individual pharmaceutical products, such as pills or tablets. The indicia may be applied by laser engraving. The indicia could be printed in more than one color. The indicia may be stitched, for example, onto labels of clothes.

With the relative ease of in-market recognition and reading, the indicia may be used in a wide variety of operations including quality assurance, customer redemption (as proof of purchase), stock control, tracking and tracing products, brand protection and real-time product monitoring, and the indicia may be used in conjunction with other tags or coding systems, for example, to allow data on several articles to be conveniently stored together in a storage device such as a radio frequency identification (RFID) tag, which may be located on the exterior of a multi-pack and which may contain the unique code of the indicia of the individual articles within the pack.

EXAMPLES

The following examples are intended to illustrate the invention and not to limit or otherwise restrict the invention.

Example 1

FIG. 7 shows examples of composite indicia that may be formed in accordance with the invention. In each case, the indicium evolves from stage A through stage C of FIG. 1. The indicium need not consist solely of lines, but may comprise other elements and shapes, such as dots, rectangles or ellipses, or indeed any combination of these elements.

Example 2

Figure 8:
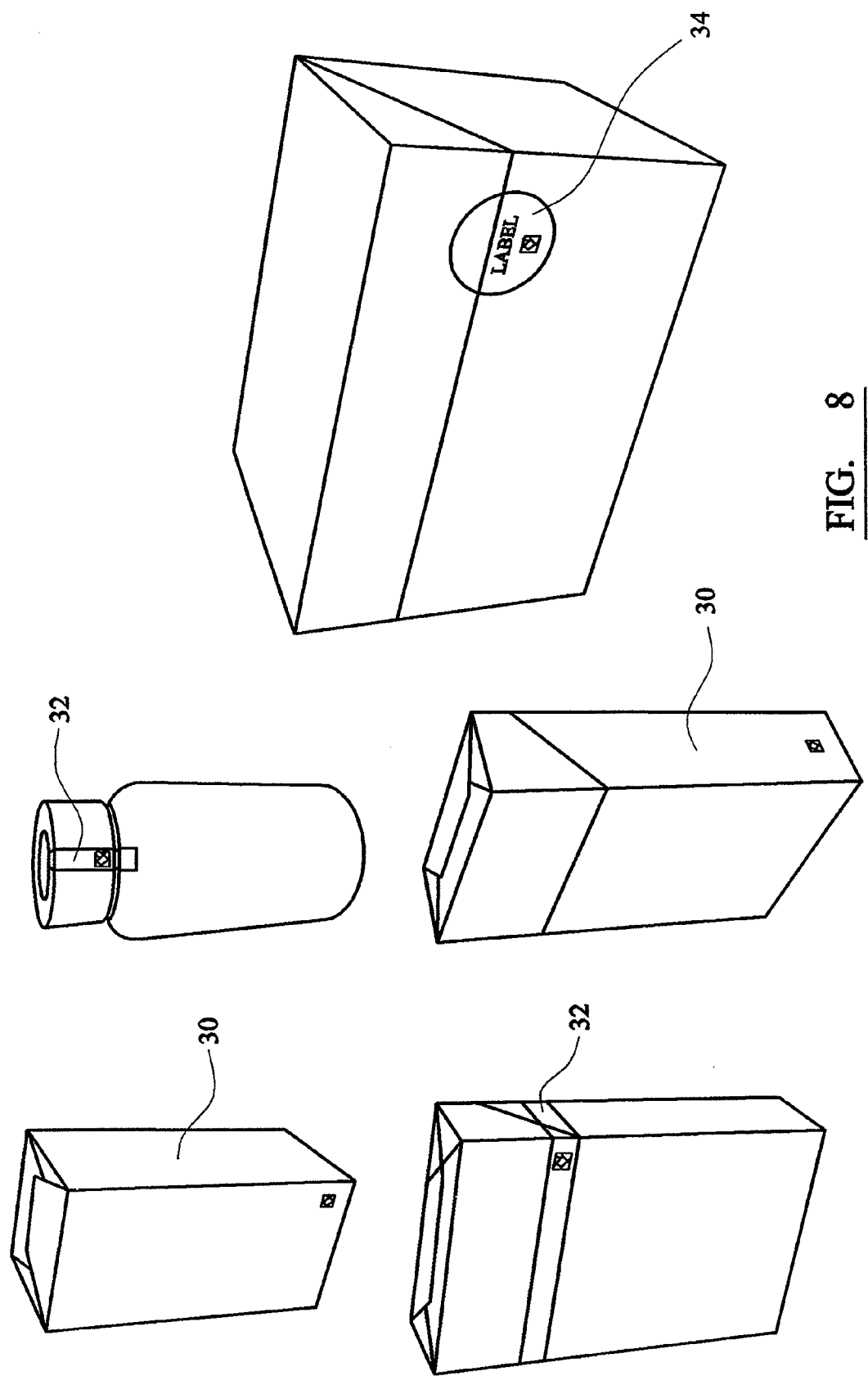
FIGS. 8 to 11 show a selection of articles to which unique composite indicia have been applied in accordance with the invention.

FIGS. 8 to 11 show various articles which bear composite indicia in accordance with the invention. In FIG. 8 the indicium appears directly on the packaging 30, on tear tapes 32 and on a label 34.

Figure 9:
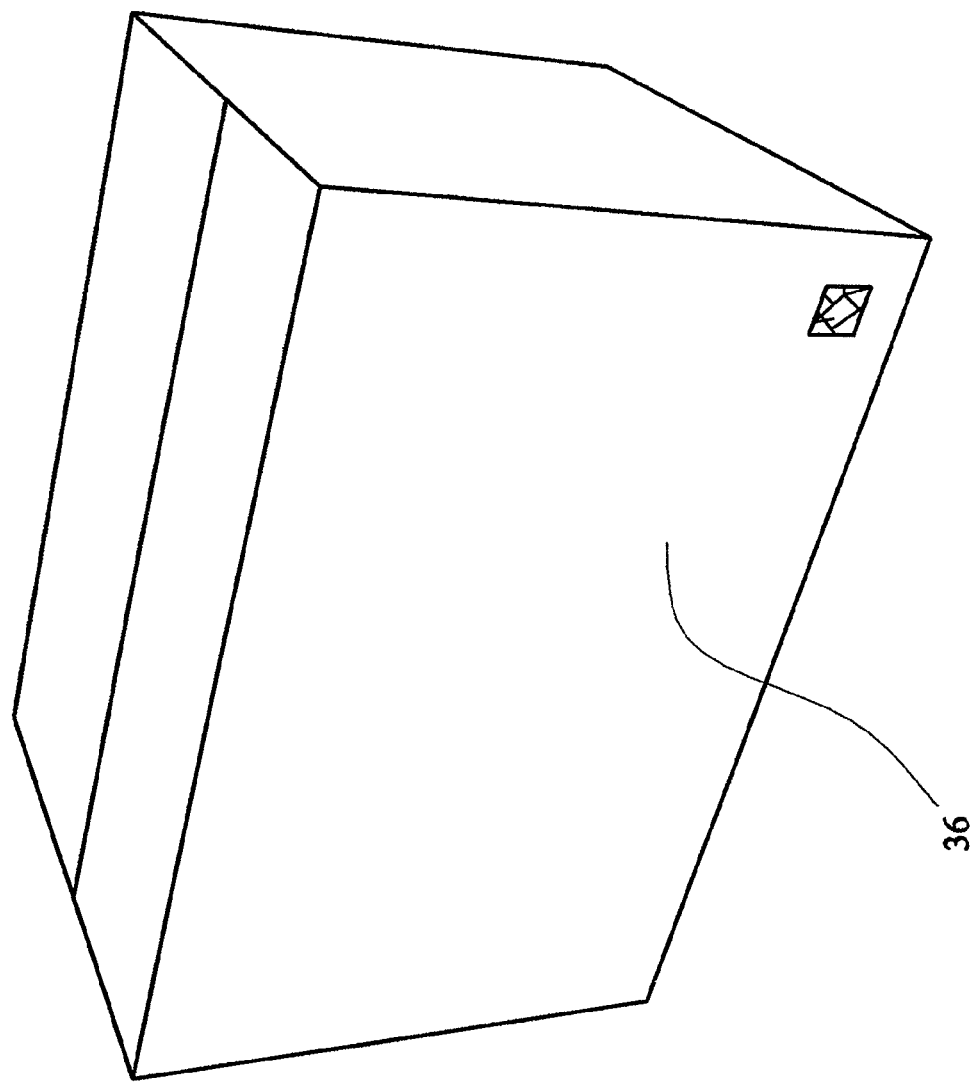

FIG. 9 shows a relatively large composite indicium 37 on the outside of a cardboard box 36.

Figure 10:
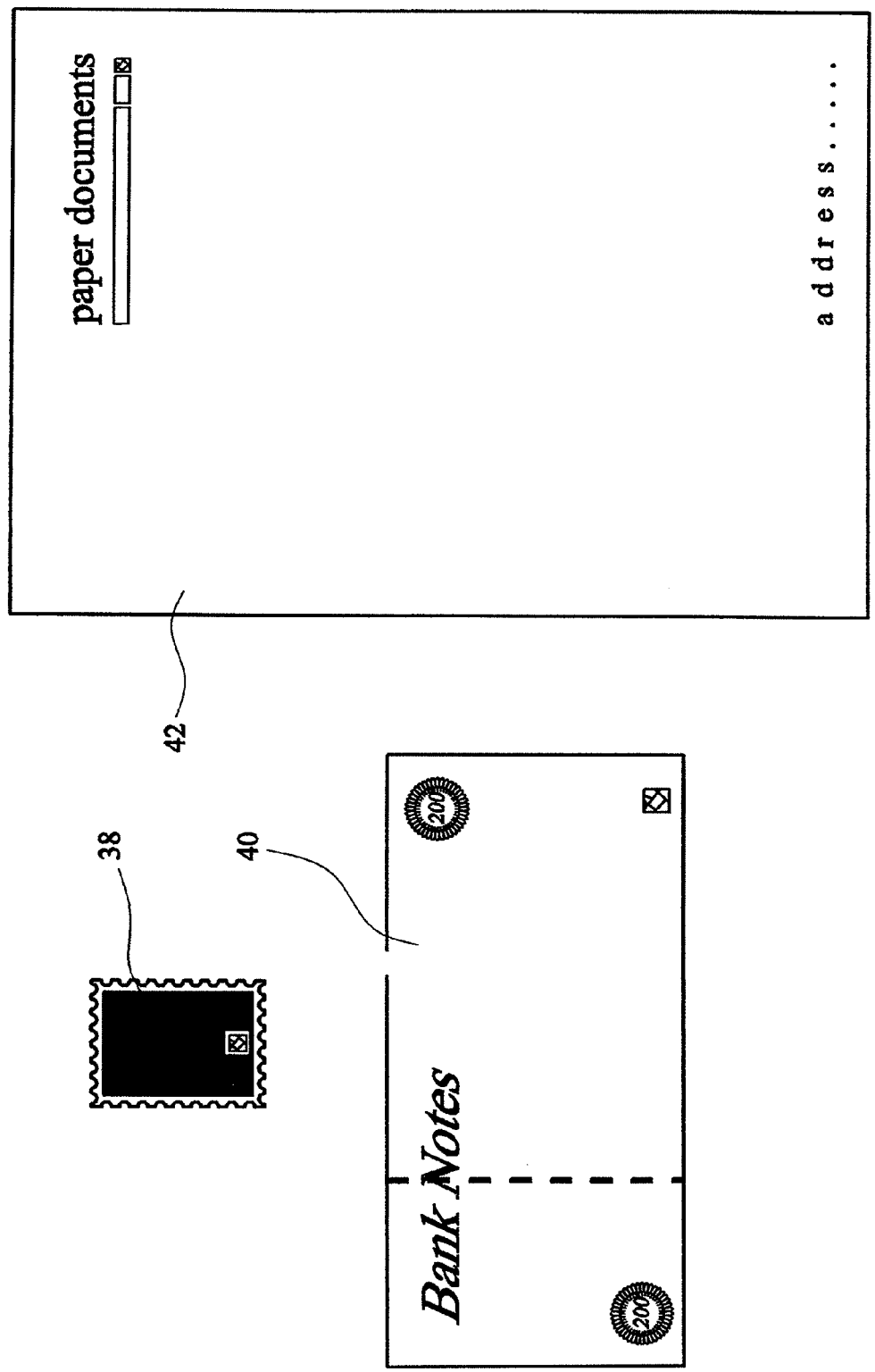
Figure 11:
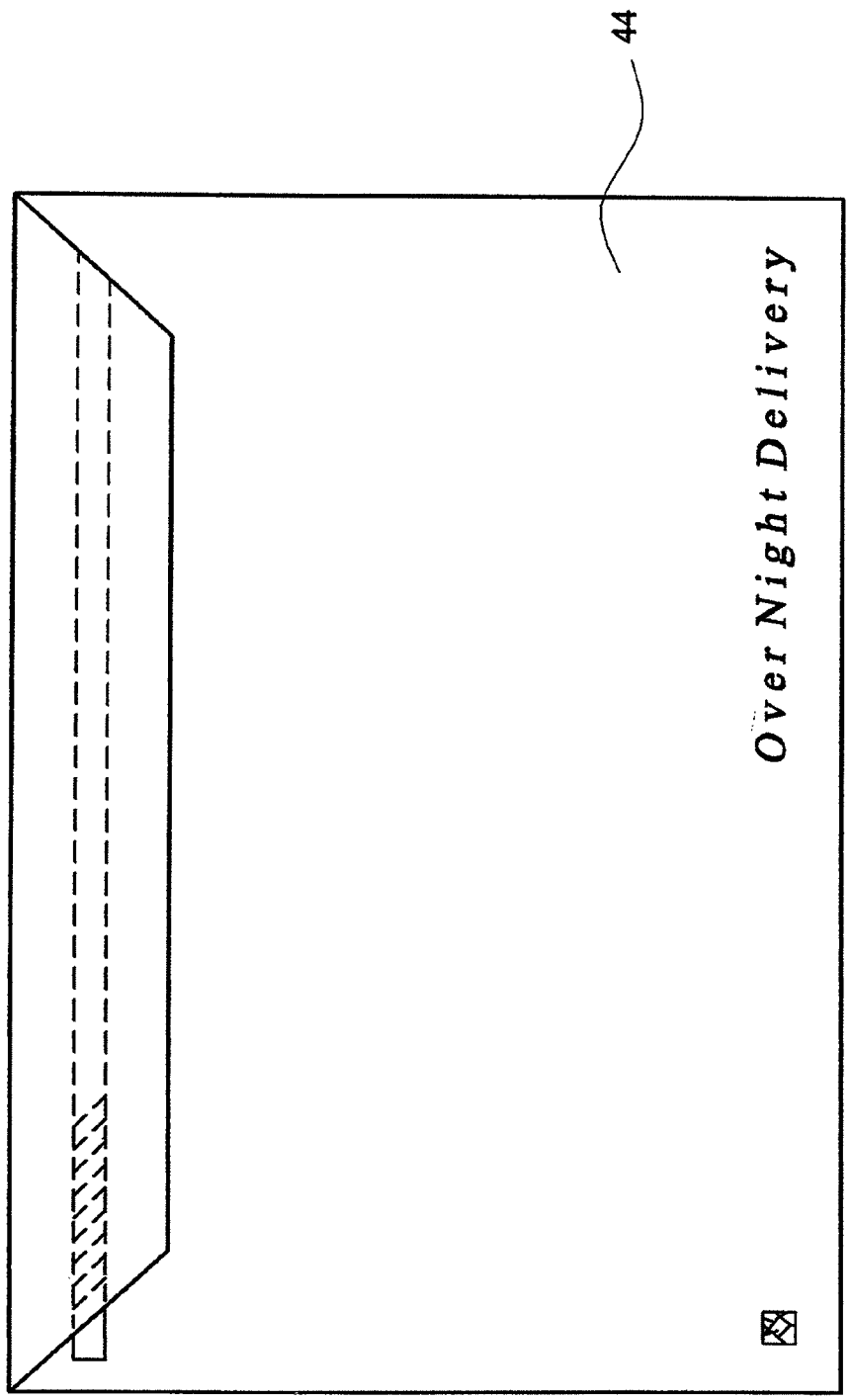

FIG. 10 shows a postage stamp 38 (which may be alternatively a tax stamp), a bank note 40 and an envelope 42, each bearing a composite indicium 39, 41, 43 in accordance with the present invention, whilst FIG. 11 shows an envelope, commonly referred to as a "document mailer", 44, such as is used by a postal courier service for sending urgent documents, and which also bears a composite indicium 45 as described above.

Example 3

A composite indicium was printed on one side of a tear tape, as commonly used for initiating opening of packaging wrap and the like. The tear tape had a width of approximately 2.9 mm. The indicium was printed using a gravure printing process to provide the separate patterns in black lines. Each of the printed composite indicium measured about 1.9 mm by about 1.9 mm. It should be noted that the size of composite indicia (markings) may be widely variable from substantially microscopic to large, i.e. multiple inches.

Example 4

Figure 18:
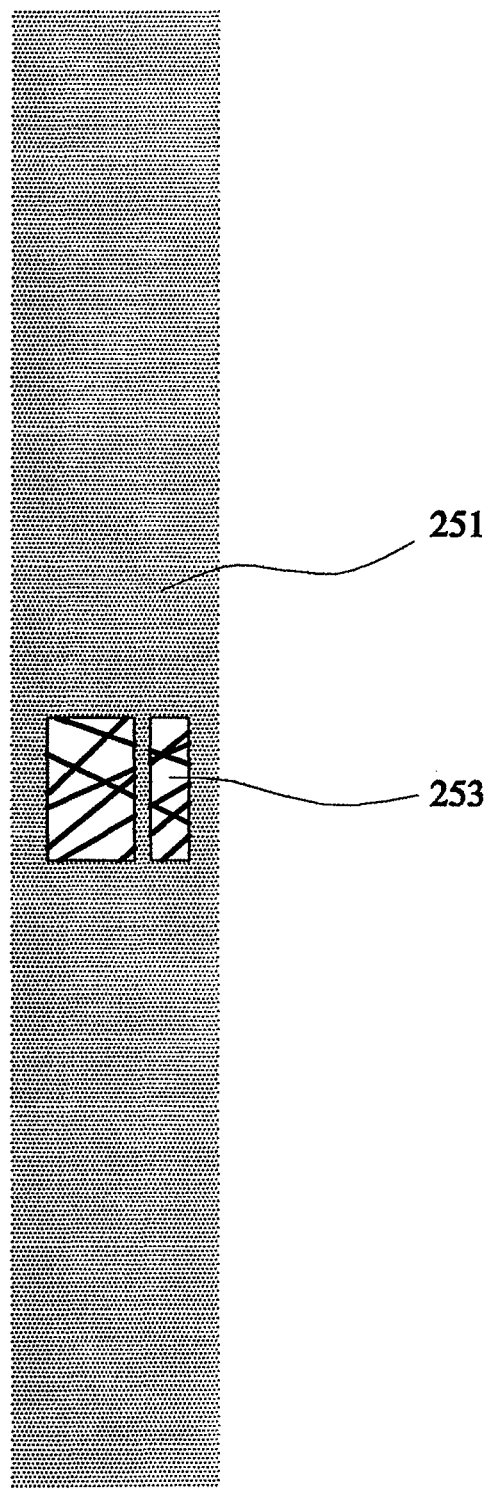
FIG. 18 shows an example of a tear tape in accordance with an embodiment of the invention.

FIG. 18 shows an example of a tear tape 251 in accordance with an embodiment of the invention. A portion of tear tape 251 comprises a unique composite indicium 253 (that may correspond to indicium 100 as shown in FIG. 5). The portion of tear tape 251 may be affixed to an article (e.g. a bottle of an alcoholic beverage) or a package (e.g. a package of cigarettes) that holds the article in order to identify the article. Each article is assigned a composite indicium so that each article may be associated with information about the article that may be stored in a database. FIG. 16 illustrates an example of database entry 200, in which a bottle of an alcoholic beverage is identified by a unique code 201 (as determined from composite indicium 253), human readable (HR) number 203, time stamp 205, brand/type 207, factory identification 209, and date 211. In the example, when the bottle of the alcoholic beverage is delivered to its destination, the composite indicium may be scanned and database 200 may be accessed through the Internet. Consequently, information about inventory or distribution of goods, for example, can be updated. Moreover, the article may be verified as being genuine and not counterfeit.

Example 5

Figure 25:
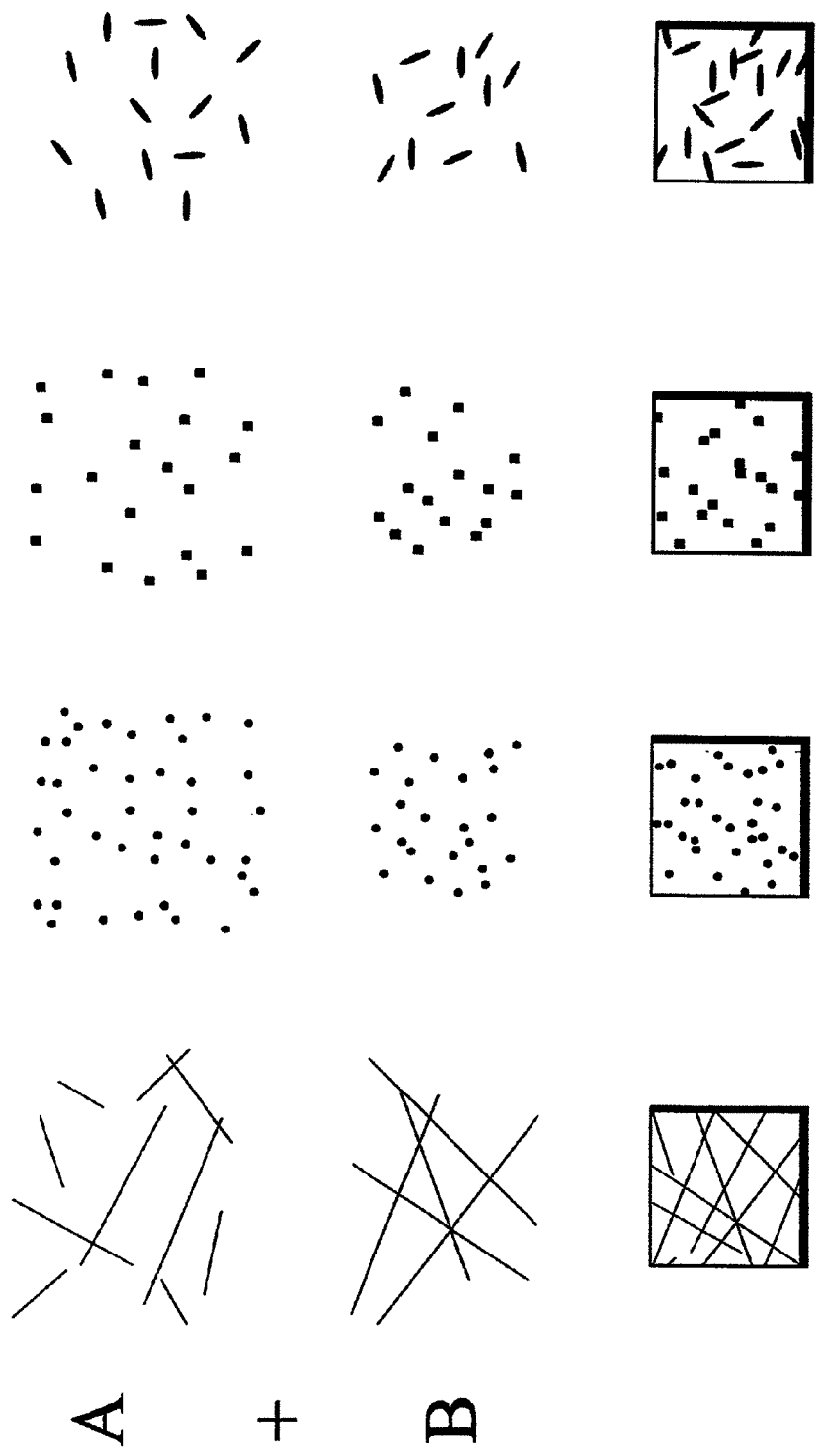
FIG. 25 shows alternative embodiments of indicia in schematic stages according to FIG. 12.

FIG. 25 shows examples of composite indicia that may be formed in accordance with the invention. In each case, the composite indicium evolves from stage A through stage C of FIG. 12. The indicium need not consist solely of lines, but may comprise other elements and shapes, such as dots, rectangles or ellipses, or indeed any combination of these elements. In FIG. 25, two variable indicia are printed at A and B. A further printing step prints a border on the composite indicium, to give one of the composite indicia printed at the bottom of the diagram.

In general, therefore, a first and a second indicia are made to overlay one another and thereby express a composite. The composite will be distinct in each instance where the first and second indicia (patterns) are juxtaposed with respect to every other composite. The universe of distinct composites can be further enlarged by identifying separate parts or sectors of each of the juxtaposed composites. For example, a boundary condition may be applied to various distinct sectors of the composite. Then if the boundary condition is applied to a series of different composites, the resulting combinations will, in each instance, be unique even though the boundary condition is the same. Of course, each composite may host a multiple number of discrete boundary conditions. As a result of the described methodology, there is created multiple unique indicia by means of simple, inexpensive techniques using combinations of pre-existing technologies.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

It is to be understood that the above-described embodiments are merely illustrative principles of the invention and that many variations may be devised by those skilled in the art without departing from the scope of the invention. It is, therefore, intended that such variations be included with the scope of the claims.

What is claimed is:

1. Apparatus for associating data with an article selected from a plurality of articles, the apparatus including:
    generator means arranged to generate and apply to a substrate of the article a unique, meaningless composite indicium that is unique to each article selected from the plurality of articles, the generator means comprising a print cylinder for printing at least part of the composite indicium, said unique composite indicium comprised of a combination of at least two starting indicium;
    scanning means arranged to scan the composite indicium to acquire an image of the composite indicium,
    processing means arranged to apply an algorithm to the acquired image to derive a character string associated with the composite indicium, and to attribute selected data to the character string, and
    storage means arranged to store the character string and attributed data.

2. Apparatus according to claim 1 wherein the scanning means is arranged to acquire, in electronic form, a representation of the composite indicium.

3. Apparatus according to claim 1 wherein the processing means is arranged to derive from the composite indicium a character string which is unique.

4. Apparatus according to claim 1 wherein the storage means comprises an electronic database.

5. Apparatus according to claim 1, wherein the indicia are holographic or metallised.

6. Apparatus according to claim 1 wherein the scanning means is arranged to acquire, in electronic form, a representation of the composite indicium.

7. Apparatus according to claim 1 wherein the processing means is arranged to derive from the composite indicium a character string which is unique.

8. Apparatus according to claim 1 wherein the storage means comprises an electronic database.

9. Apparatus according to claim 1, wherein the indicia are holographic or metallised.

10. Apparatus for associating data with each article selected from a plurality of articles, the apparatus including:
    means arranged to apply a unique, meaningless composite indicium to a substrate of the article, scanning means arranged to scan the composite indicium disposed on the article to acquire an image of the composite indicium,
    processing means arranged to apply an algorithm to the acquired image to derive a character string associated with the composite indicium, and to attribute selected data to the character string, and
    storage means arranged to store the character string and attributed data, wherein the means arranged to apply the composite indicium is one or more techniques selected from the group consisting of gravure-, form-, letterpress-, laser-, inkjet-, dot pen-, thermo transfer- or offset- printing means; laser engraving means and embossing means.

11. Apparatus according to claim 10 wherein the scanning means is arranged to acquire, in electronic form, a representation of the composite indicium.

12. Apparatus according to claim 10 wherein the processing means is arranged to derive from the composite indicium a character string which is unique.

13. Apparatus according to claim 10 wherein the storage means comprises an electronic database.

14. Apparatus according to claim 10, wherein the indicia are holographic or metallised.

15. A method of associating data with each article selected from a plurality of articles, the method including:
    generating and applying to a substrate of the article a unique, meaningless composite indicium,
    scanning the composite indicium,
    applying an algorithm to convert the scanned composite indicium into a character string,
    attributing selected data to the character string, and
    storing the character string and attributed data in a storage device,
    wherein the method includes printing the composite indicium on the substrate, using a print cylinder.

16. A method according to claim 15, wherein the step of scanning the composite indicium comprises acquiring in electronic form a representation of the composite indicium.

17. A method according to claim 15 wherein the method includes converting the scanned composite indicium into a character string which is unique.

18. A method according to claim 15 wherein the method includes storing the character string and attributed data in a storage device which comprises an electronic database.

19. A method according to claim 15, wherein the indicia are holographic or metallised.

20. A method of associating data with each article selected from a plurality of articles, the method including:
    applying by machine a unique, meaningless composite indicium to a substrate of the article;
    scanning the composite indicium disposed on the article;
    applying an algorithm to convert the scanned composite indicium into a character string;

attributing selected data to the character string; and storing the character string and attributed data in a storage device, wherein the step of applying the composite indicium is one or more techniques selected from the group consisting of: printing by gravure, form, letterpress, laser, inkjet, dot pen, thermo transfer or offset; laser engraving and embossing.

21. A method according to claim 20, wherein the step of scanning the composite indicium comprises acquiring in electronic form a representation of the composite indicium.

22. A method according to claim 20 wherein the method includes converting the scanned composite indicium into a character string which is unique.

23. A method according to claim 20 wherein the method includes storing the character string and attributed data in a storage device which comprises an electronic database.

24. A method according to claim 20, wherein the indicia are holographic or metallised.

* * * * *

UNITED STATES PATENT AND TRADEMARK OFFICE
CERTIFICATE OF CORRECTION

| | | |
|---|---|---|
| PATENT NO. | : 7,891,565 B2 | |
| APPLICATION NO. | : 12/372992 | |
| DATED | : February 22, 2011 | |
| INVENTOR(S) | : Stephen Paul Pinchen et al. | |

It is certified that error appears in the above-identified patent and that said Letters Patent is hereby corrected as shown below:

Title Page, Item (54) and at Column 1, lines 1 and 2,

Please make the following correction to the title:

(54)   METHOD AND APPARATUS FOR MARKING ARTICLES

Signed and Sealed this
Third Day of May, 2011

David J. Kappos
*Director of the United States Patent and Trademark Office*